(12) United States Patent
Kim et al.

(10) Patent No.: US 11,202,279 B2
(45) Date of Patent: *Dec. 14, 2021

(54) METHOD AND APPARATUS FOR PROCESSING DATA IN WIRELESS COMMUNICATION SYSTEM

(71) Applicant: Samsung Electronics Co., Ltd., Gyeonggi-do (KR)

(72) Inventors: Donggun Kim, Seoul (KR); Soenghun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 15/872,640

(22) Filed: Jan. 16, 2018

(65) Prior Publication Data

US 2018/0206213 A1     Jul. 19, 2018

(30) Foreign Application Priority Data

Jan. 16, 2017    (KR) .................. 10-2017-0007170
Jan. 31, 2017    (KR) .................. 10-2017-0013984
Aug. 25, 2017    (KR) .................. 10-2017-0107713

(51) Int. Cl.
    *H04W 72/04*       (2009.01)
    *H04L 29/06*       (2006.01)
    (Continued)

(52) U.S. Cl.
    CPC ............ *H04W 72/04* (2013.01); *H04L 69/22* (2013.01); *H04L 69/322* (2013.01); *H04W 28/065* (2013.01)

(58) Field of Classification Search
    CPC .... H04W 72/04; H04W 28/065; H04L 69/22; H04L 69/322

(Continued)

(56) References Cited

U.S. PATENT DOCUMENTS 9,912,447 B2 *   3/2018   Kim ..................... H04L 1/1854
2007/0121636 A1    5/2007   Kim et al.
(Continued)

FOREIGN PATENT DOCUMENTS

EP     2 334 026       6/2011
EP     2 351 449       8/2011
(Continued)

OTHER PUBLICATIONS

International Search Report dated Apr. 2, 2018 issued in counterpart application No. PCT/KR2018/000753, 6 pages.
(Continued)

*Primary Examiner* — Kwang B Yao
*Assistant Examiner* — Syed M Bokhari
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. One method provided for a transmitting device to pre-process data in a wireless communication system includes acquiring data, pre-processing the data in at least one layer of the transmitting device before receiving resource allocation information for transmitting the data, receiving the resource allocation information for transmitting the data, and generating a medium access control (MAC) protocol data unit (PDU) based on the pre-processed data and the received resource allocation information.

20 Claims, 24 Drawing Sheets

(51) Int. Cl.
*H04L 29/08* (2006.01)
*H04W 28/06* (2009.01)

(58) Field of Classification Search
USPC .............. 370/329, 280, 328, 235, 331, 336
See application file for complete search history.

(56) References Cited

U.S. PATENT DOCUMENTS

| | | | |
|---|---|---|---|
| 2007/0140261 A1 | 6/2007 | Wang et al. | |
| 2009/0163211 A1* | 6/2009 | Kitazoe | H04W 74/004 |
| | | | 455/436 |
| 2009/0316637 A1 | 12/2009 | Yi et al. | |
| 2010/0128742 A1 | 5/2010 | Chun et al. | |
| 2010/0232356 A1* | 9/2010 | Maheshwari | H04L 1/1867 |
| | | | 370/328 |
| 2011/0044297 A1* | 2/2011 | Lee | H04W 28/06 |
| | | | 370/336 |
| 2011/0188377 A1* | 8/2011 | Kim | H04L 49/9021 |
| | | | 370/235 |
| 2011/0188464 A1* | 8/2011 | Shinohara | H04W 72/046 |
| | | | 370/329 |
| 2011/0223904 A1 | 9/2011 | Fan et al. | |
| 2012/0275399 A1* | 11/2012 | Liu | H04W 28/065 |
| | | | 370/329 |
| 2014/0071948 A1* | 3/2014 | Kim | H04W 36/02 |
| | | | 370/331 |
| 2015/0117319 A1* | 4/2015 | Yang | H04W 74/004 |
| | | | 370/329 |
| 2015/0365968 A1* | 12/2015 | Kim | H04B 7/2656 |
| | | | 370/280 |
| 2016/0037526 A1* | 2/2016 | Kim | H04W 76/27 |
| | | | 370/329 |
| 2017/0006649 A1 | 1/2017 | Zhao et al. | |
| 2018/0103395 A1* | 4/2018 | Gholmieh | H04L 1/1867 |
| 2018/0248658 A1* | 8/2018 | Belleschi | H04B 17/309 |

FOREIGN PATENT DOCUMENTS

| | | |
|---|---|---|
| WO | WO 2007/078691 | 7/2007 |
| WO | WO 2009/154414 | 12/2009 |
| WO | WO 2010/059087 | 5/2010 |

OTHER PUBLICATIONS

European Search Report dated Oct. 29, 2019 issued in counterpart application No. 18738506.7-1213, 8 pages.
Qualcomm Incorporated, "MAC CE Placement", R2-1700585, 3GPP TSG-RAN WG2 Meeting NR ad-hoc, Jan. 17-19, 2017, 2 pages.
Korean Office Action dated Mar. 30, 2021 issued in counterpart application No. 10-2017-0107713, 8 pages.

* cited by examiner

METHOD AND APPARATUS FOR PROCESSING DATA IN WIRELESS COMMUNICATION SYSTEM

PRIORITY

This application claims priority under 35 U.S.C. § 119 to a Korean Patent Application filed in the Korean Intellectual Property Office on Jan. 16, 2017 and assigned Serial No. 10-2017-0007170; a Korean Patent Application filed in the Korean Intellectual Property Office on Jan. 31, 2017 and assigned Serial No. 10-2017-0013984; and a Korean Patent Application filed in the Korean Intellectual Property Office on Aug. 25, 2017 and assigned Serial No. 10-2017-0107713, the contents of all of which are incorporated herein by reference.

BACKGROUND

1. Field of the Disclosure

The present disclosure relates generally to a data processing method and apparatus for improving processing performance in a wireless communication system, and more particularly, to a pre-processing method and apparatus for accelerating data processing of a transmitting device and to a feedback method and apparatus of a terminal in the next generation mobile communication system.

2. Description of the Related Art

To meet the demand for wireless data traffic which has increased since deployment of 4th generation (4G) communication systems, efforts have been made to develop an improved $5^{th}$ generation (5G) or pre-5G communication system. Therefore, the 5G or pre-5G communication system is sometimes also called the "Beyond 4G Network" or the "Post LTE (Long Term Evolution) System" '. It is under consideration for the 5G communication system to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (mMIMO), full dimension MIMO (FD-MIMO), array antenna, an analog beam forming, large scale antenna techniques are also being considered for 5G communication systems. Development for system network improvement for 5G communication systems is under way based on advanced small cells, cloud radio access networks (RANs), ultra-dense networks, device-to-device (D2D) communication, wireless backhaul, moving network, cooperative communication, coordinated multipoints (CoMP), reception-end interference cancellation and the like. For 5G systems, hybrid frequency shift keying (FSK) and quadrature amplitude modulation (QAM) Modulation (FQAM), sliding window superposition coding (SWSC), adaptive coding and modulation (ACM), filter bank multi-carrier (FBMC), non-orthogonal multiple access (NOMA), and sparse code multiple access (SCMA) are being developed as advanced access technologies.

The Internet is now evolving into the Internet of things (IoT) where distributed entities, such as inanimate objects, exchange and process information without human intervention. The Internet of everything (IoE), which is a combination of the IoT technology and the "Big Data" processing technology implemented through Internet connections with a cloud server, has emerged. As technology, such as sensing technology, wired/wireless communication and network infrastructure technology, service interface technology, and security technology," are being demanded for IoT implementation, sensor networks, machine-to-machine (M2M) communication, machine type communication (MTC), and so forth are being researched. Such an IoT environment may provide intelligent Internet technology services that creates value for human life by collecting and analyzing data generated among connected things. IoT may be applied to a variety of fields including smart homes, smart buildings, smart cities, smart cars or connected cars, smart grids, health care, smart appliances and advanced medical services through convergence and combination between existing information technology (IT) and various industrial applications. Application of a cloud radio access network (RAN) as part of the above-described Big Data processing technology may also be considered to be as an example of the convergence between the 5G technology and the IoT technology.

Meanwhile, many discussions are being conducted for improving data processing speed in next generation communication systems.

SUMMARY

The present disclosure has been made in order to solve the above problems and to provide the advantages below.

Next generation mobile communication systems have to enable data rates up to 20 Gbps in the downlink and 10 Gbps in the uplink along with a very short latency response time. Accordingly, a mobile terminal or user equipment (UE) will have to support a very high data processing speed to transmit and receive data in a next generation mobile communication system. In current long-term evolution (LTE) systems, one obstacle to improving data processing speed is that the terminal cannot carry out any data pre-processing before being allocated uplink transmission resources from the network because of the concatenation function of the radio link control (RLC) layer.

In accordance with an aspect of the present disclosure, a method for pre-processing data by a transmitting device is provided. The data processing method includes acquiring data; pre-processing the data in at least one layer of the transmitting device before receiving resource allocation information for transmitting the data, receiving the resource allocation information for transmitting the data, and generating a medium access control (MAC) protocol data unit (PDU) based on the pre-processed data and the received resource allocation information.

In accordance with another aspect of the present disclosure, a transmitting device is provided. The transmitting device includes a transceiver configured to transmit and receive signals and a controller configured to acquire data, pre-process the data before receiving resource allocation information for transmitting the data, receive the resource allocation information for transmitting the data, and generate a medium access control (MAC) protocol data unit (PDU) based on the pre-processed data and the received resource allocation information.

BRIEF DESCRIPTION OF THE DRAWINGS

The above and other aspects, features, and advantages of embodiments of the present disclosure will be more apparent from the following detailed description taken in conjunction with the accompanying drawings, in which.

DETAILED DESCRIPTION

Embodiments of the present disclosure are described in detail below with reference to the accompanying drawings. Detailed descriptions of well-known functions and structures incorporated herein may be omitted to avoid obscuring the subject matter of the present disclosure. Detailed descriptions of well-known functions and structures incorporated herein may be omitted to avoid obscuring the subject matter of the present disclosure.

In the following description, the terms indicating various access nodes, network entities, messages, interfaces between network entities, and information items are used for convenience of explanation of the present disclosure. Accordingly, the terms used in the following description are not limited to specific meanings, and they may be replaced by other terms that are equivalent in technical meaning.

In the following description, the terms and definitions given in the 3$^{rd}$ Generation Partnership Project Long Term Evolution (3GPP LTE) standard are used. However, the present disclosure is not necessarily limited by those terms and definitions, and the present disclosure can be applied to other standard communication systems including 5$^{th}$ generation new radio (5G NR) systems.

The data processing method and apparatus according to various embodiments of the present disclosure is applicable to a transmitting device configured for use in a 5G NR system. The transmitting device may be a part of an NR base station or an NR terminal. In the following description, the term "base station" may be used to mean an NR base station, and the term "terminal" may be used to mean an NR terminal. Although the description is directed to the operation of a terminal as an example of the transmitting device, the present disclosure is not limited thereto, and it may be applicable to the operation of a base station.

According to an embodiment of the present disclosure, a packet data convergence protocol (PDCP) layer may refer to a logical layer and/or a physical device configured to perform PDCP layer operations. A radio link control (RLC) layer may refer to a logical layer and/or a physical device configured to perform RLC layer operations. A media access control (MAC) layer may refer to a logical layer and/or a physical device configured to perform MAC layer operations. A physical (PHY) layer may refer to a logical layer and/or a physical device configured to perform PHY layer operations. It may be possible to implement layer-specific physical devices, which operate under the control of at least one device (e.g., controller of the transmitting device).

In the present disclosure, a device configured to perform the PDCP layer operations may be referred to as a PDCP device, a device configured to perform the RLC layer operations may be referred to as an RLC device, and a device configured to perform the MAC layer operations may be referred to as a MAC device.

Figure 1:
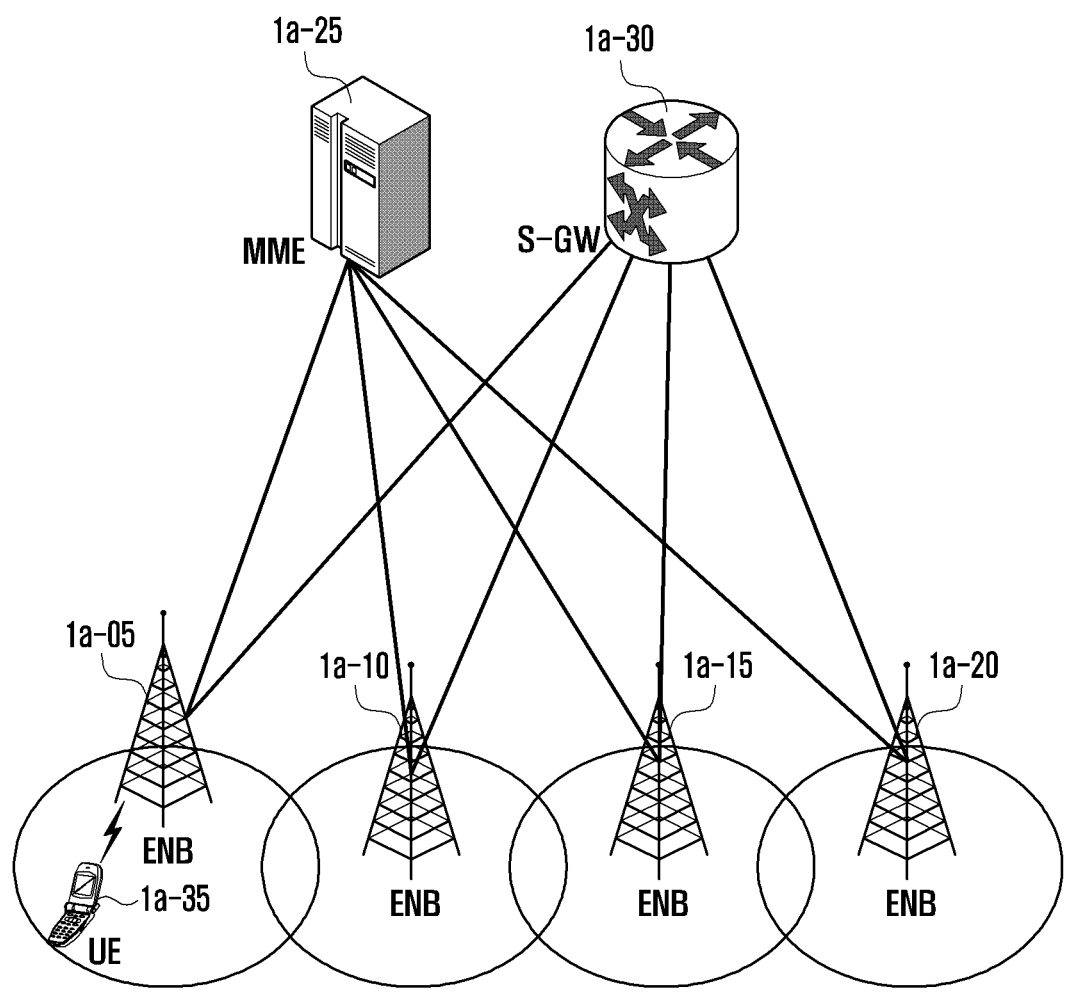
FIG. 1 is a diagram illustrating an LTE system architecture.

FIG. 1 is a diagram illustrating LTE system architecture.

In FIG. 1, the LTE system includes evolved Node Bs (eNBs or base stations) 1a-05, 1a-10, 1a-15, and 1a-20 as parts of an evolved universal mobile telecommunications system terrestrial radio access network (EUTRAN) and a mobility management entity (MME) 1a-25 and a serving gateway (S-GW) 1a-30 as parts of an evolved packet core (EPC). A User Equipment (UE) or terminal 1a-35 connects to an external network via one of the eNBs 1a-05, 1a-10, 1a-15, and 1a-20 and the S-GW 1a-30.

In FIG. 1, the eNBs 1a-05, 1a-10, 1a-15, and 1a-20 correspond to legacy node Bs of universal mobile communications system (UMTS). The UE 1a-35 establishes a wireless connection to one of the eNBs 1a-05, 1a-10, 1a-15, and 1a-20, which may perform more complex operations in comparison with the legacy node B. In the LTE system where all user traffic including real time services such as Voice over IP (VoIP) is served through shared channels, it is necessary to schedule UEs based on scheduling information such as buffer status, power headroom status, and channel status collected from the UEs, and an eNB serving the UEs takes charge of this function. Typically, one eNB operates multiple cells. For example, the LTE system adopts orthogonal frequency division multiplexing (OFDM) as a radio access technology to secure a data rate of up to 100 Mbps in a bandwidth of 20 MHz. The LTE system also adopts AMC to determine the modulation scheme and channel coding rate in adaptation to the channel condition of the UE. The S-GW 1a-30 establishes and releases data bearers under the control of the MME 1a-25. The MME 1a-25 takes charge of various control functions and maintains connections with a plurality of eNBs.

Figure 2:
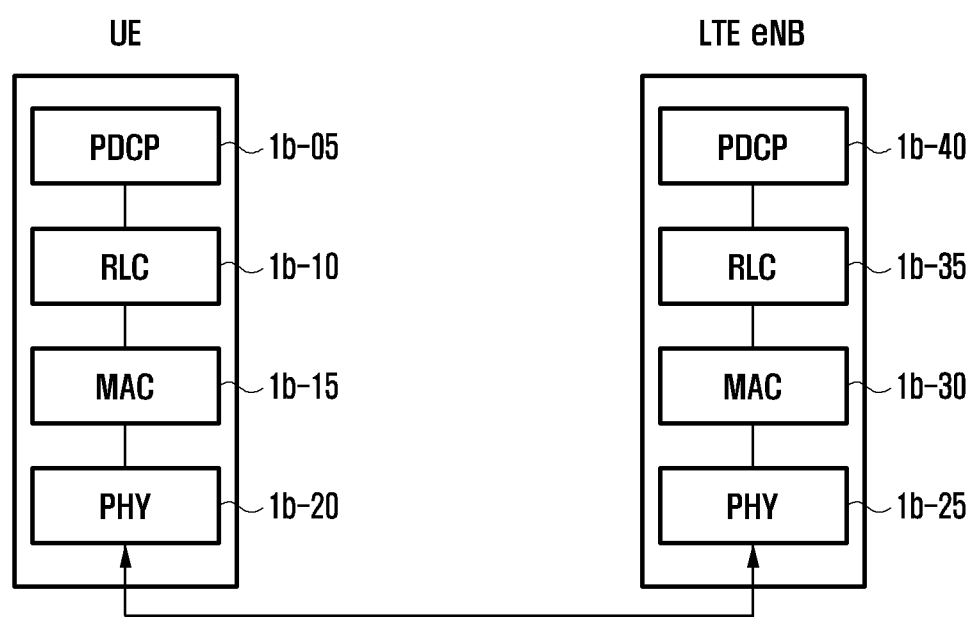
FIG. 2 is a diagram illustrating protocol stacks which interface between a UE and an eNB in an LTE system to which the present disclosure may be applied.

FIG. 2 is a diagram illustrating protocol stacks which interface between a UE and an eNB in an LTE system to which the present disclosure may be applied.

As shown in FIG. 2, the protocol stack of the interface between the UE and the eNB in the LTE system includes a plurality of protocol layers stacked from the bottom to the top: the physical layer (PHY) denoted by reference numbers 1b-20 and 1b-25, the medium access control (MAC) layer denoted by reference numbers 1b-15 and 1b-30, the radio link control (RLC) layer denoted by reference numbers 1b-10 and 1b-35, and the packet data convergence protocol (PDCP) layer denoted by reference numbers 1b-05 and 1b-40. The PDCP layer denoted by reference numbers 1b-05 and 1b-40 controls compressing/decompressing internet protocol (IP) headers.

The main functions of the PDCP layer/protocol can be summarized as follows:
- Header compression and decompression: robust header compression (ROHC) only
- Transfer of user data
- In-sequence delivery of upper layer packet data units (PDUs) at PDCP re-establishment procedure in RLC acknowledged mode (RLC AM)
- For split bearers in dual connectivity (DC) (only support for RLC AM): PDCP PDU routing for transmission and PDCP PDU reordering for reception
- Duplicate detection of lower layer service data units (SDUs) at PDCP re-establishment procedure in RLC AM
- Retransmission of PDCP SDUs at handover and, for split bearers in DC, of PDCP PDUs at PDCP data-recovery procedure, in RLC AM
- Ciphering and deciphering
- Timer-based SDU discard in uplink The RLC layer designated by reference number 1b-10 and 1b-35 takes charge of reformatting PDCP PDUs in order to fit them into the size for automatic repeat request (ARQ) operations. The main functions of the RLC layer/protocol can be summarized as follows:
- Transfer of upper layer PDUs
- Error correction through ARQ (only for AM data transfer)
- Concatenation, segmentation, and reassembly of RLC SDUs (only for unacknowledged mode (UM) and AM data transfer)
- Re-segmentation of RLC data PDUs (only for AM data transfer)
- Reordering of RLC data PDUs (only for UM and AM data transfer)
- Duplicate detection (only for UM and AM data transfer)
- Protocol error detection (only for AM data transfer)
- RLC SDU discard (only for UM and AM data transfer)
- RLC re-establishment The MAC layer denoted by reference number 1b-15 and 1b-30 allows for connection of multiple RLC entities established separately in a UE and eNB and takes charge of multiplexing RLC PDUs from the RLC layer into a MAC PDU and demultiplexing a MAC PDU into RLC PDUs. The main functions of the MAC layer/protocol can be summarized as follows:
- Mapping between logical channels and transport channels
- Multiplexing/demultiplexing of MAC SDUs belonging to one or different logical channels into/from transport blocks (TB) delivered to/from the physical layer on transport channels
- Scheduling information reporting
- Error correction through hybrid automatic repeat request (HARQ)
- Priority handling between logical channels of one UE
- Priority handling between UEs by means of dynamic scheduling
- Multimedia broadcast multicast service (MBMS) service identification
- Transport format selection
- Padding The PHY layer denoted by reference numbers 1b-20 and 1b-25 performs channel-coding and modulation on upper layer data to generate and transmit OFDM symbols over a radio channel and demodulating and channel-decoding of OFDM symbols received over the radio channel to deliver the decoded data to the upper layers.

Figure 3:
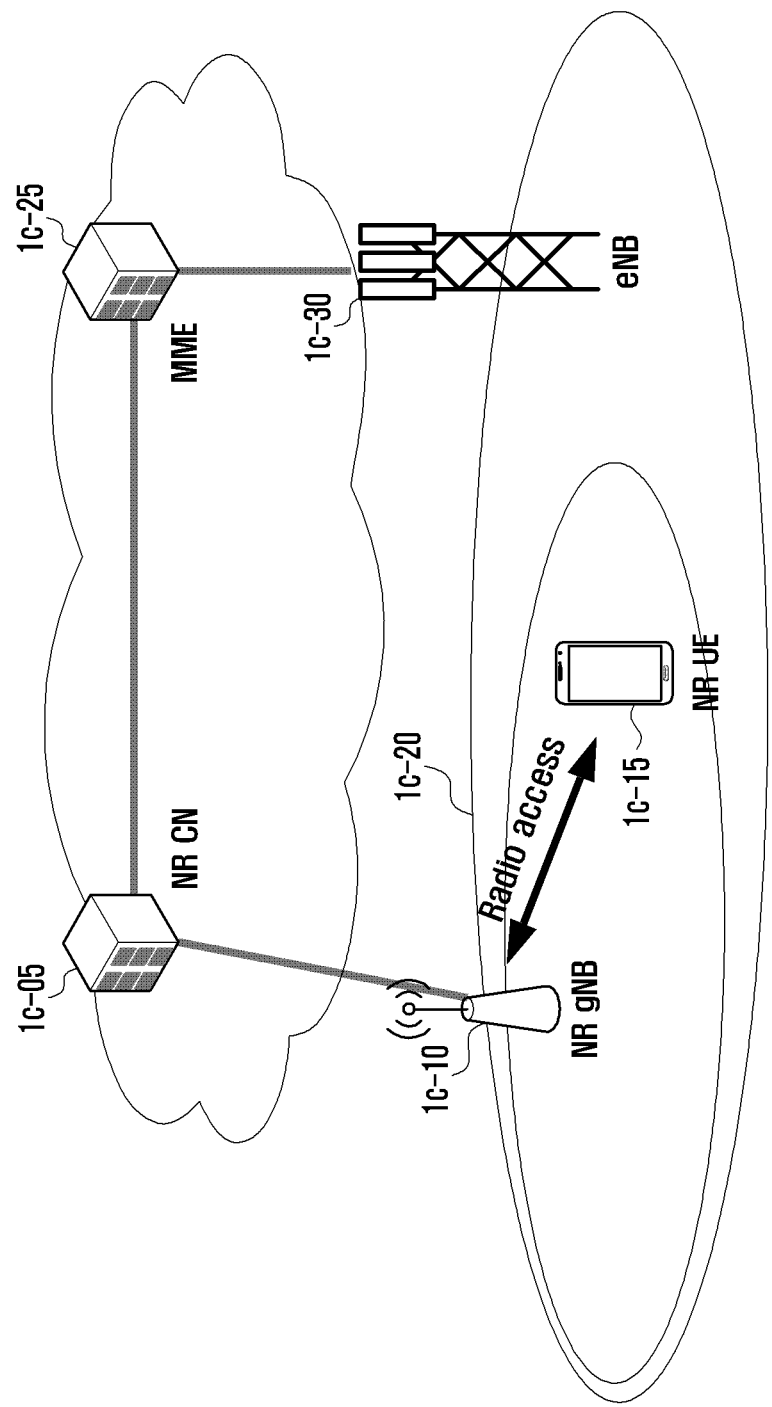
FIG. 3 is a diagram illustrating next generation mobile communication system architecture to which the present disclosure may be applied.

FIG. 3 is a diagram illustrating next generation mobile communication system architecture to which the present disclosure may be applied.

As shown in FIG. 3, the next generation mobile communication system includes a radio access network with a next generation base station (referred to as "NR gNB" or "gNB" by the 3GPP) 1c-10 and a new radio core network (NR CN) 1c-05. A new radio user equipment (NR UE) or terminal 1c-15 connects to an external network via the NR gNB 1c-10 and the NR CN 1c-05.

In FIG. 3, the NR gNB 1c-10 corresponds to an evolved Node B (eNB) of the legacy LTE. The NR gNB 1c-10 to which the NR UE 1c-15 connects through a radio channel is capable of providing superior services in comparison with the legacy eNB. In the next generation mobile communication system where all user traffic is served through shared channels, it is necessary to schedule the NR UEs based on scheduling information such as buffer status, power headroom status, and channel status collected by the NR UEs, and the NR gNB 1c-10 performs this function. Typically, one NR gNB operates multiple cells. In order to achieve a data rate higher than the peak data rate of legacy LTE systems, the next generation mobile communication systems may adopt beamforming techniques along with orthogonal frequency division multiple access (OFDMA) as a radio access technology. The next generation mobile communication system may also adopt AMC to determine the modulation scheme and channel coding rate in adaptation to the channel condition of the NR UE. The NR CN 1c-05 takes charge of mobility support, bearer setup, and quality of service (QoS) configuration. The NR CN 1c-05 may take charge of an NR UE mobility management function, and a plurality of NR gNBs may connect to the NR CN 1c-05. The next generation mobile communication system may also interoperate with a legacy LTE system and, in this case, the NR CN 1c-05 connects to an MME 1c-25 through a network interface. The MME 1c-25 communicates with at least one eNB 1c-30 as a legacy base station.

Figure 4:
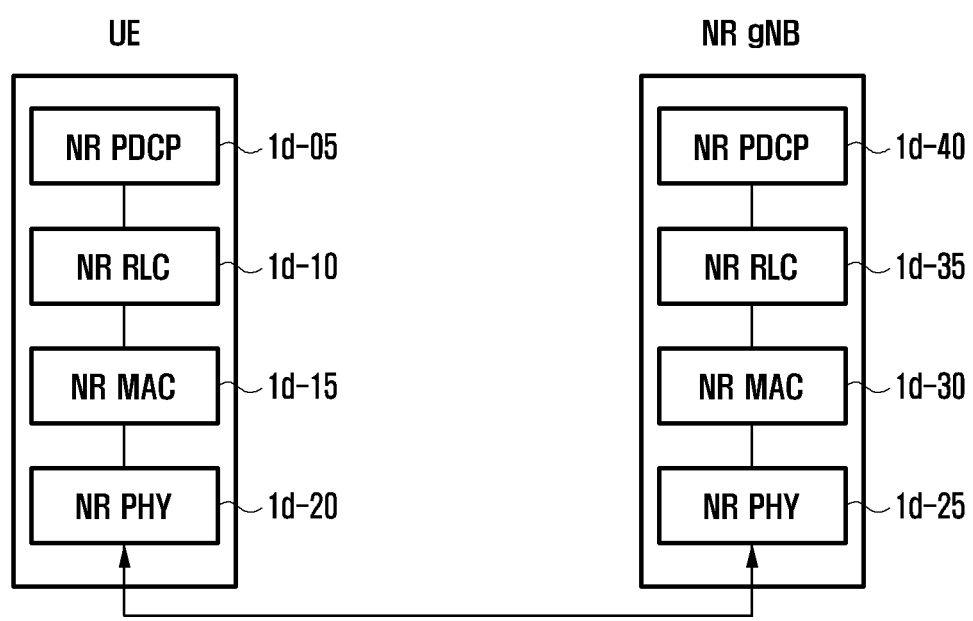
FIG. 4 is a diagram illustrating a protocol stack of an interface between an NR UE and an NR gNB in a next generation mobile communication system according to an embodiment of the present disclosure.

FIG. 4 is a diagram illustrating protocol stacks which interface between an NR UE and an NR gNB in a next generation mobile communication system according to an embodiment of the present disclosure.

As shown in FIG. 4, each of the protocol stacks in the NR UE and the NR gNB includes a plurality of protocol layers stacked from the bottom to the top: the NR PHY layer denoted by reference numbers 1d-20 and 1d-25, the NR MAC layer denoted by reference numbers 1d-15 and 1d-30, the NR RLC layer denoted by reference numbers 1d-10 and 1d-35, and the NR PDCP layer denoted by reference numbers 1d-05 and 1d-40.

The main functions of the NR PDCP layer 1d-05 and 1d-40 may include some of the following functions:
  Header compression and decompression: ROHC only
  Transfer of user data
  In-sequence delivery of upper layer PDUs
  PDCP PDU reordering for reception
  Duplicate detection of lower layer SDUs
  Retransmission of PDCP SDUs
  Ciphering and deciphering
  Timer-based SDU discard in uplink The PDCP PDU reordering function of an NR PDCP entity is to reorder the PDCP PDUs delivered from a lower layer based on the PDCP sequence number (PDCP SN) and may include delivering the reordered data to an upper layer, recording the missing PDCP PDUs among the reordered PDCP PDUs, transmitting a status report indicating the missing PDCP PDUs to the sender, and requesting for retransmission of the missing PDCP PDUs.

The main functions of the NR RLC layer 1d-10 and 1d-35 may include some of the following functions.
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment The in-sequence delivery function of an NR RLC entity is to deliver the RLC SDUs received from the lower layer to the upper layer and may include reassembling, when multiple segmented RLC SDUs which constitute an original RLC SDU are received, the RLC SDUs and delivering the reassembled RLC SDU to the upper layer; reordering the received RLC PDUs based on the RLC sequence number (SN) or PDCP SN; recording the missing RLC PDUs among the reordered RLC PDUs; transmitting a status report indicating the missing RLC PDUs to the sender; requesting for retransmission of the missing RLC PDUs; and delivering, when there is a missing RLC PDU, the RLC PDUs before the missing RLC PDU in sequence, delivering, if a predetermined timer expires even when there is any missing RLC SDU, all RLC SDUs received before the start of the timer to the upper layer in sequence, or delivering, if a predetermined timer expires even when there is any missing RLC SDU, all RLC SDUs received until then to the upper layer in sequence. It may also be possible to process the RLC PDUs in the receiving sequence (in the order of arrival regardless of sequence number) and deliver the RLC PDUs to the PDCP entity out of order (out-of-sequence delivery) and, if an RLC PDU is transmitted in the form of segments, to store the received segments, or wait until all segments constituting the RLC PDU are received and reassemble the segments into the original RLC PDU, which is delivered to the PDCP entity. The NR RLC layer may have no concatenation function and, in this case, the concatenation function may be performed in the NR MAC layer or replaced by the multiplexing function of the NR MAC layer.

The out-of-sequence delivery function of an NR RLC entity is to deliver the RLC SDUs received from the lower layer to the upper layer out of order and may include reassembling, when multiple segmented RLC SDUs constituting an original RLC SDU are received, the segmented RLC SDUs, delivering the reassembled RLC SDUs to the upper layer, arranging the received RLC PDUs based on the RLC SN or PDCP SN, and recording the SN of the missing RLC PDUs.

In the NR MAC layer 1d-15 and 1d-30, an NR MAC entity may be connected to multiple NR RLC entities, and the main functions of the NR MAC entity may include some of the following functions:
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding The NR PHY layer 1d-20 and 1d-25 performs channel-coding and modulation on upper layer data to generate and transmit OFDM symbols over a radio channel and demodulating and channel-decoding of OFDM symbols received over the radio channel to deliver the decoded data to the upper layers.

The protocol stack layers/protocols may be implemented in the form of a processor, processing unit, or processing module in a layer-specific manner (e.g., NR PDCP, NR RLC, and NR MAC layer) to be responsible for the functions of the corresponding layer or in a manner to be responsible for the functions of at least two layers. The processor, processing unit, or processing module may be included in a controller of a device (e.g., NR UE and NR gNB).

Figure 5:
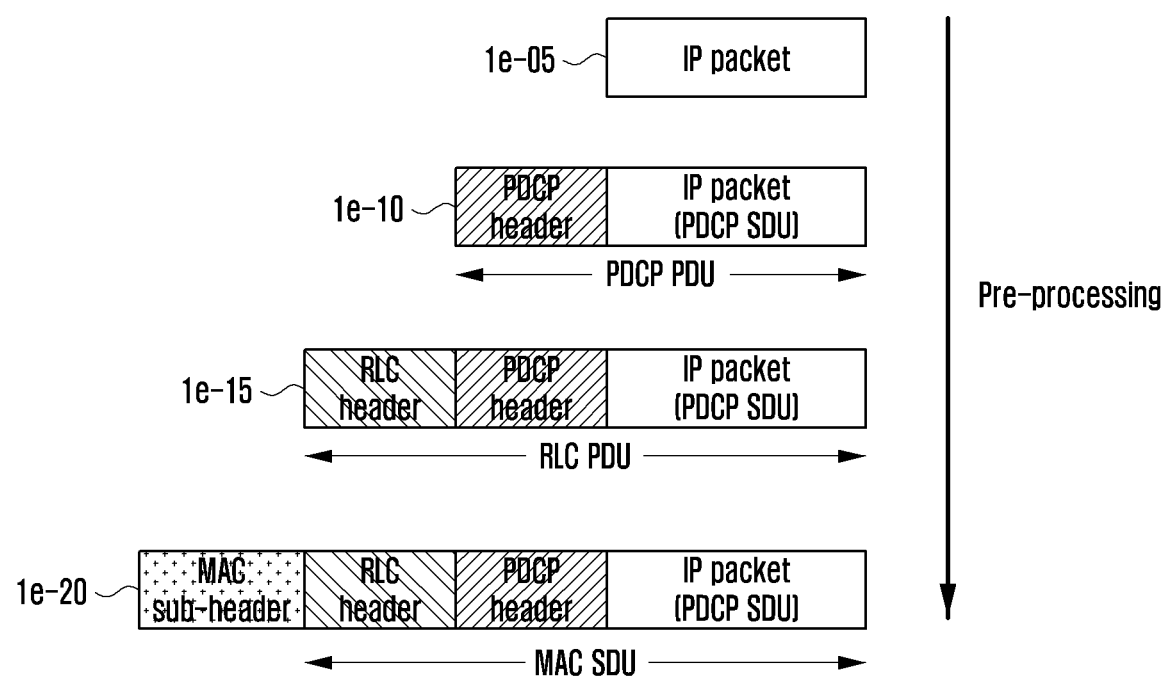
FIG. 5 is a diagram illustrating data pre-processing for accelerating the data processing speed of an NR gNB or NR UE according to an embodiment of the present disclosure.

FIG. 5 is a diagram illustrating data pre-processing for accelerating the data processing speed of an NR gNB or NR UE according to an embodiment of the present disclosure.

In FIG. 5, a transmitting device (NR gNB or UE) of a next generation mobile communication system may perform pre-processing on a data packet 1e-05 received from an upper layer in the user plane. According to an embodiment of the present disclosure, pre-processing is an operation of processing data in at least one of the PDCP layer and lower layers below the PDCP layer before being allocated resources for transmitting the data. For example, configuring a PDCP PDU 1*e*-10 (Internet Protocol (IP) packet 1*e*-05+ PDCP header), an RLC PDU 1*e*-15 (PDCP PDU+RLC header), and a MAC PDU 1*e*-20 (MAC SDU+MAC sub-header) before receiving resource allocation information for transmitting the data is pre-processing. That is, if it is possible for an NR UE to configure a MAC SDU and a MAC sub-header in advance before receiving the uplink resource information (e.g., uplink grant), the NR UE may generate a MAC PDU immediately upon receipt of the uplink grant and transmit the MAC PDU without delay. In the case of configuring an RLC PDU in advance, the NR UE may configure a MAC SDU and a MAC header based on the RLC PDU immediately upon receiving the uplink grant to generate a MAC PDU and then transmit the MAC PDU.

If the amount of pre-processed data is greater than the allocated resources (uplink grant), it may be possible to fill the allocated resources with as much pre-processed data as possible and then the remaining space with segments of the remaining pre-processed data. For example, assuming pre-processing of n RLC PDUs, it may occur that the uplink resources provide space enough to contain n−1 RLC PDUs but insufficient to contain n RLC PDUs. In this case, it may be possible to segment the last RLC PDU of the n pre-processed RLC PDUs to fill the space remaining after filling n−1 RLC PDUs. If the last RLC PDU is segmented, the RLC header and MAC sub-header may be updated. The segmentation operation may be performed in such a way that a MAC entity requests an RLC entity to segment the data. The RLC entity may segment data and update the RLC header to generate new RLC PDUs, which are sent to the MAC entity. The MAC entity may update the MAC sub-header and fill the remaining space of the uplink transmission resources with at least one of the new RLC PDUs. It may also be possible for the MAC entity to perform the segmentation and RLC and MAC header update and fill the remaining space of the uplink transmission resources with at least one of the RLC PDUs generated with the segments. In this case, the MAC entity may provide the RLC entity with the information on the segmented data.

It may also be possible to apply pre-processing operations to the NR gNB. In the case of the NR gNB, if it is possible to configure a MAC SDU and a MAC sub-header before the corresponding RLC entity receives the NR UE-specific resource allocation information, the NR gNB may generate a MAC PDU immediately, when the RLC entity receives the NR UE-specific resource allocation information, and transmit the MAC PDU. If the amount of pre-processed data is greater than the resource amount allocated to the corresponding NR UE, it may be possible to fill the allocated resources with as much pre-processed data as possible and then fill the remaining space with segments of the remaining pre-processed data. The segmentation operation may be performed in such a way that a MAC entity requests an RLC entity to segment the data. The RLC entity may segment data and update the RLC header to generate RLC PDUs, which are sent to the MAC entity. The MAC entity may update the MAC sub-header and fill the remaining space of the uplink transmission resources with at least one of the RLC PDUs generated with the segments.

It may also be possible for the MAC entity to perform the segmentation and RLC and MAC header update and fill the remaining space of the uplink transmission resources with at least one of the RLC PDUs generated with the segments. In this case, the MAC entity may provide the RLC entity with the information on the segmented data. For example, it may be possible to insert or update a field indicative of the segmentation (e.g., a framing information (FI) field, a segment information (SI) field, last segment flag (LSF) field, or other field conveying information indicating a segmenting point of the data) in the RLC header and update the length field of the MAC header because the length of a MAC SDU is changed by segmentation (or insert segmentation-related information conveying the updated MAC header length).

Figure 6A:
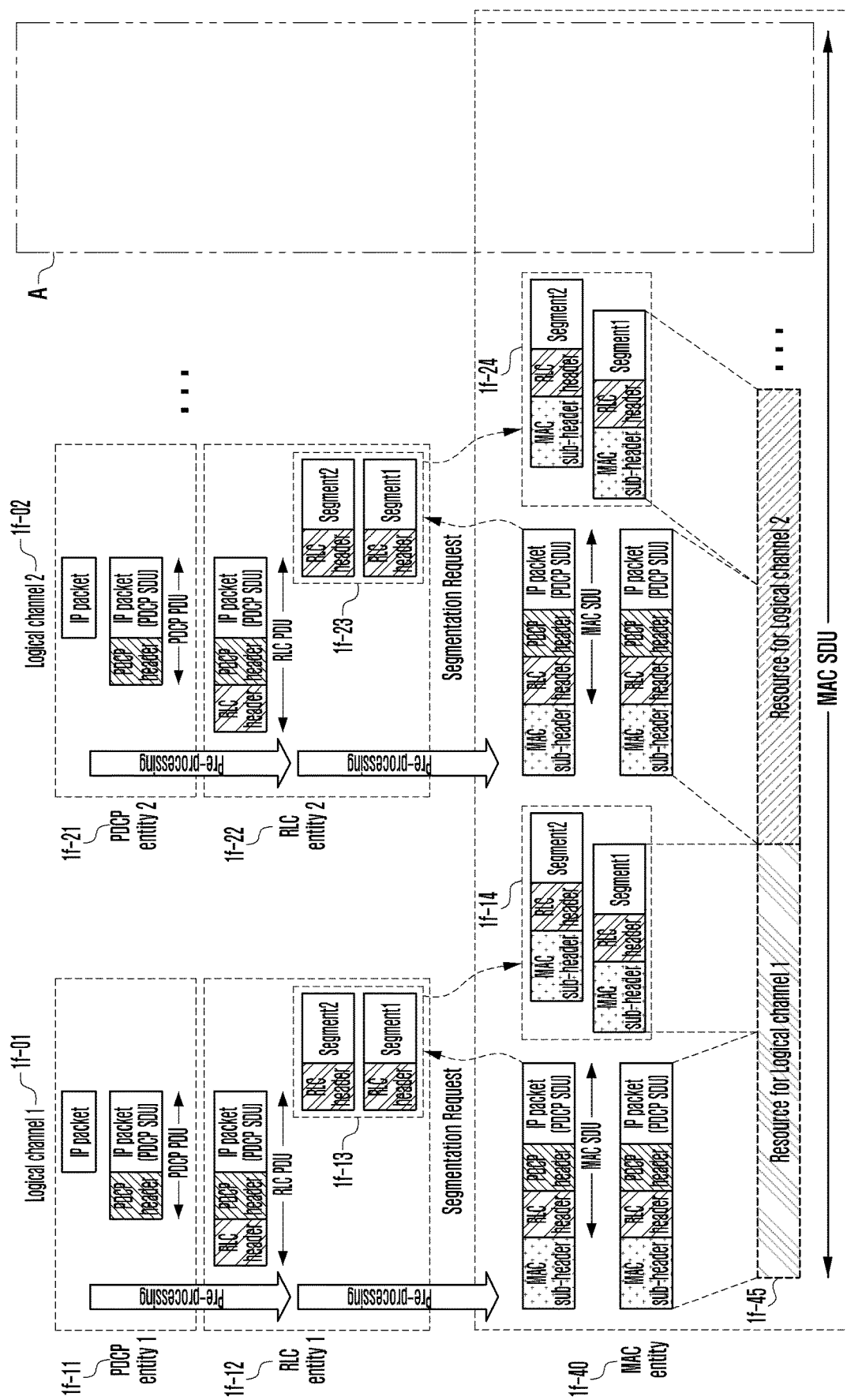
FIGS. 6A and 6B are diagrams illustrating a data pre-processing procedure for accelerating the data processing speed of an NR gNB or an NR UE according to embodiment 1-1 of the present disclosure.
Figure 6B:
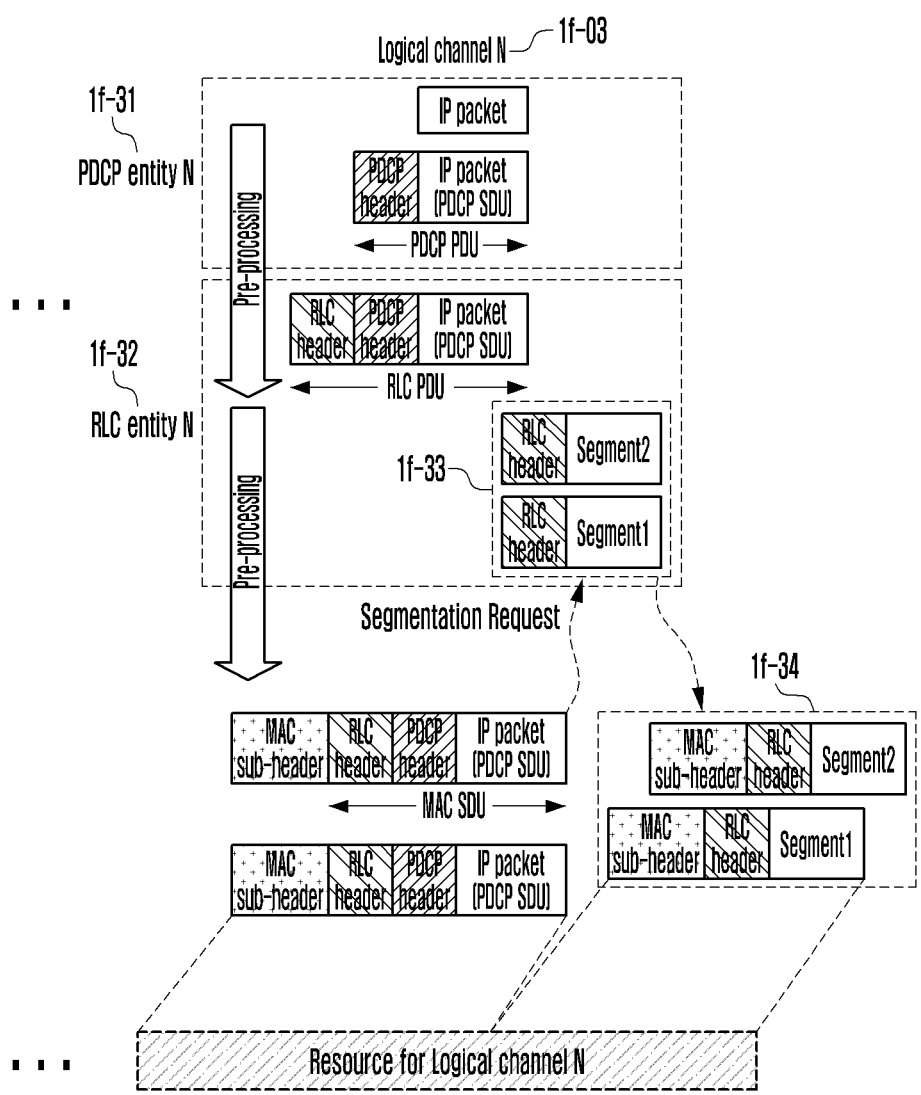

FIGS. 6A and 6B are diagrams illustrating a data pre-processing procedure for accelerating the data processing speed of an NR gNB or an NR UE according to embodiment 1-1 of the present disclosure.

In FIGS. 6A and 6B, a UE (or gNB) configures multiple logical channels (bearers). Specifically, the UE configures logical channel 1 1*f*-01, logical channel 2 1*f*-02, . . . , logical channel N 1*f*-03 (indicated by box A in FIG. 6A and shown in detail in FIG. 6B). Each of the PDCP entities 1*f*-11, 1*f*-21, and 1*f*-31 of the respective logical channels 1*f*-01, 1*f*-02, and 1*f*-03 generates a PDCP PDU by adding a PDCP header to an IP packet received from an upper layer. According to an embodiment of the present disclosure, the PDCP entities 1*f*-11, 1*f*-21, and 1*f*-31 perform data pre-processing before being allocated resources for data transmission. The PDCP entities 1*f*-11, 1*f*-21, and 1*f*-31 may send their respective PDCP PDUs to the corresponding RLC entities 1*f*-12, 1*f*-22, and 1*f*-32 before being allocated resources for data transmission. For example, if a predetermined condition for the RLC entities to continue pre-processing is configured, the PDCP entities 1*f*-11, 1*f*-21, and 1*f*-31 determine whether the predetermined condition is fulfilled and, if the condition is fulfilled, send their respective PDCP PDUs to the corresponding RLC entities 1*f*-12, 1*f*-22, and 1*f*-32 to continue data pre-processing. If the predetermined condition is not fulfilled, each of the PDCP entities 1*f*-11, 1*f*-21, and 1*f*-31 generate the PDCP PDUs but hold sending the PDCP PDU to the corresponding RLC entities 1*f*-12, 1*f*-22, and 1*f*-32 until the predetermined condition is fulfilled. If no predetermined condition is configured, each of the PDCP entities 1*f*-11, 1*f*-21, and 1*f*-31 generate their PDCP PDU and send the PDCP PDU to the respective corresponding one of the RLC entities 1*f*-12, 1*f*-22, and 1*f*-32 without waiting to fulfill the predetermined condition.

The predetermined condition for sending preprocessed PDUs/SDUs to the next layer may be configured with a threshold or threshold value. For example, the threshold may be set to an arbitrary value or a value indicative of the size of a transport block (TB) that the MAC entity 1*f*-40 can transmit during a transmission time interval (TTI). When a threshold is configured, it is possible to continue pre-processing data until the total amount of the pre-processed data becomes greater than or equal to the amount indicated by the threshold. The total amount of the pre-processed data may be one of the amount of the pre-processed PDCP PDUs, the amount of the pre-processed RLC PDUs, or the amount of the pre-processed MAC SDUs and corresponding MAC sub-headers. The amount of the pre-processed data may be one of a sum or subset of the amount of the pre-processed PDCP PDUs, the amount of the pre-processed RLC PDUs, or the amount of the pre-processed MAC SDUs and corresponding MAC sub-headers.

The threshold may also be an arbitrary value. The threshold value may be preconfigured or determined by the UE or acquired from a radio resource control (RRC) message (or MAC CE or control signal) transmitted by the gNB (or network). The threshold value may be updated when the UE switches from one cell to another or when the gNB transmits an RRC connection reconfiguration message (RRCConnectionReconfiguration, see, e.g., steps 1*n*-15 or 1*n*-35 of FIG.

15) to the UE. The threshold value may be updated when a UE capable of carrier aggregation (CA) adds or deletes a cell. For example, if the serving cell change is made from an old cell to a new cell, the UE may update the threshold to a maximum size of a TB that can be transmitted during the TTI of the new cell. When a new cell is configured (or added, activated) in addition to the old cell, the threshold may be updated to a new value obtained by summing the maximum TB sizes of the old and new cells. When one of the previously configured (or activated) cells is deleted, the threshold may be updated to a value obtained by subtracting the maximum TB size of the deleted cell from the previous threshold.

The threshold or predetermined condition may be configured per logical channel. That is, the threshold or predetermined condition may be configured per logical channel in consideration of the type of bearer, QoS, priority, required data rate, and required transmission delay. The threshold or predetermined condition may be configured autonomously by the UE or according to an RRC message transmitted by the network in embodiments according to the present disclosure.

The predetermined condition may be a request or part of a request generated by an MAC entity 1f-40. That is, the PDCP entities 1f-11, 1f-21, and 1f-31 may perform pre-processing upon receipt of a pre-processing request indicator generated by the MAC entity 1f-40. In this case, if there is no request from the MAC entity 1f-40, pre-processing is not performed. The pre-processing operation may be initiated by a MAC entity or, if a predetermined trigger condition is fulfilled in the UE, a controller (or processor) of the UE. The pre-processing operation may be configured by the gNB.

If the PDCP PDUs (RLC SDUs) are received from the PDCP entities 1f-11, 1f-21, and 1f-31, the RLC entities 1f-12, 1f-22, and 1f-32 may perform pre-processing on the data before being allocated resources for data transmission. For example, the RLC entities 1f-12, 1f-22, and 1f-32 may generate RLC PDUs and send them to the MAC entity 1f-40 before being allocated the resources for data transmission. When a predetermined condition is configured, the RLC entities 1f-12, 1f-22, and 1f-32 generate, when the condition is fulfilled, RLC PDUs by adding RLC headers to the PDCP PDUs and send the RLC PDUs to the MAC entity 1f-40 to continue pre-processing. If the predetermined condition is not fulfilled, the RLC entities 1f-12, 1f-22, and 1f-32 store the PDCP PDUs (RLC SDUs) in buffers and wait until the predetermined condition is fulfilled. If no predetermined condition is configured, the RLC entities 1f-12, 1f-22, and 1f-32 may send the RLC PDUs to the MAC entity 1f-40 immediately upon generation/creation.

The predetermined condition is configured with a threshold or threshold value. For example, the threshold may be set to a value indicative of the size of a transport block (TB) that a MAC entity 1f-40 can transmit during a transmission time interval (TTI) or an arbitrary value. In the case that the threshold is configured, it may be possible to continue pre-processing data until the total amount of the pre-processed data becomes greater than the amount indicated by the threshold. The total amount of the pre-processed data may be the amount of the pre-processed PDCP PDUs, RLC PDUs, or MAC SDUs and corresponding MAC sub-headers. The amount of the data pre-processed to PDCP PDUs, RLC PDUs, or MAC SDUs and corresponding MAC sub-headers may be a subset of the set of data before being pre-processed. It may also be an arbitrary value.

The threshold value may be preconfigured or determined by the UE or acquired from an RRC message (or MAC control element (CE) or control signal) transmitted by the gNB (or network). The threshold value may be updated when the UE switches from one cell to another or when the gNB transmits an RRC connection reconfiguration (RRC-ConnectionReconfiguration) message (e.g., see step 1n-35 of FIG. 15) to the UE. The threshold value may be updated when a UE capable of carrier aggregation (CA) adds or deletes a cell. For example, if the serving cell change is made from an old cell to a new cell, the UE may update the threshold to a maximum size of a TB that can be transmitted during the TTI of the new cell. In the case where a new cell is configured (or added, activated) in addition to the old cell, it may be possible to update the threshold to a value obtained by summing the maximum TB sizes of the old and new cells. In the case where one of previously configured (or activated) cells is deleted, it may be possible to update the threshold to a value obtained by subtracting the maximum TB size of the deleted cell from the previous threshold.

The threshold or condition may be configured per logical channel. That is, the threshold or condition may be configured per logical channel in consideration of the type of bearer, QoS, priority, required data rate, and required transmission delay. The threshold or condition may be configured autonomously by the UE or according to an RRC message transmitted by the network according to embodiments of the present disclosure.

The predetermined condition may be a request generated by an MAC entity 1f-40. That is, the PDCP entities 1f-11, 1f-21, and 1f-31 may perform pre-processing upon receipt of a pre-processing request indicator generated by the MAC entity 1f-40. In this case, if there is no request from the MAC entity 1f-40, pre-processing is not performed. The pre-processing operation may be initiated by a MAC entity or, if a predetermined trigger condition is fulfilled in the UE, a controller (or processor) of the UE. The pre-processing operation may be configured by the gNB.

If the RLC PDUs are received from the RLC entities 1f-12, 1f-22, and 1f-32, the MAC entity 1f-40 may perform pre-processing to generate MAC sub-headers corresponding to the MAC SDUs (RLC PDUs). If necessary, the MAC entity 1f-40 may use a predetermined condition or threshold as described above in association with the PDCP entities 1f-11, 1f-21, and 1f-31 and the RLC entities 1f-12, 1f-22, and 1f-32.

The MAC entity 1f-40 may store the pre-processed data and, if transmission resources are allocated (after requesting transmission resources), assign predetermined sizes of resources per logical channel using the allocated transmission resources. The pre-processed data may be configured to fit the assigned resources for each of logical channels 1f-01, 1f-02, . . . , 1f-03. It may be possible to configure a MAC SDU 1f-45 with the pre-processed data of the logical channels 1f-01, 1f-02, and 1f-03. If the pre-processed data is greater than the transmission resources assigned for a certain logical channel, it may be necessary to perform segmentation. That is, if a resource unit allocated per logical channel is not enough to accommodate the pre-processed data, it may be necessary for the MAC entity 1f-40 to perform a segmentation operation to fill the resource unit with as much pre-processed data as possible and then fill any remaining space with one or more segments of the remaining pre-processed data.

The segmentation operation may be performed by the RLC entities 1f-12, 1f-22, and 1f-32 in response to a request from the MAC entity 1f-40. In this case, the RLC entities 1f-12, 1f-22, and 1f-32 may perform the segmentation operations as denoted by reference numbers 1f-13, 1f-23, and 1*f*-33 and send the segmented data (segments) with updated RLC headers to the MAC entity 1*f*-40. The MAC entity 1*f*-40 configures MAC sub-headers corresponding to the RLC PDUs containing the segments as denoted by reference numbers 1*f*-14, 1*f*-24, and 1*f*-34 and fills the remaining space with RLC PDUs having the corresponding MAC sub-headers to generate the MAC PDU. It may be necessary to insert or update a field indicative of the segmentation (e.g., a framing information (FI) field, a segment information (SI) field, a last segment flag (LSF) field, and/or another field conveying information indicating a segmenting point of the data) in the RLC header and update the length field of the MAC header because the length of a MAC SDU is changed by segmentation (or insert segmentation-related information conveying the updated MAC header length).

In the case of configuring a MAC CE, the MAC entity 1*f*-40 generates the MAC PDU including a MAC sub-header corresponding to the MAC CE along with the pre-processed data. The MAC entity 1*f*-40 of a UE may generate the MAC PDU by arranging the MAC CEs and MAC SDUs in their generation order or according to a predetermined order. It may be possible to apply at least one of the following rules: placing MAC CE at the beginning of MAC PDU, placing MAC CE at the end of MAC PDU, placing MAC CE before MAC SDU, placing MAC CE before or after MAC PDU depending on the characteristics of MAC CE, and/or determining a position of MAC CE arbitrarily depending on implementation of the UE.

The MAC entity 1*f*-40 maps the pre-processed data (e.g., MAC SDUs and MAC sub-headers) to the uplink transmission resources (uplink grant or TB size) allocated by the gNB without segmentation. If the resources remaining after mapping the pre-processed data to the uplink transmission resources is greater than X bytes (i.e., a threshold) and if there is unmapped pre-processed data, the MAC entity 1*f*-40 may request to the RLC entities 1*f*-12, 1*f*-22, and 1*f*-32 to perform segmentation on the unmapped pre-processed data. The X bytes may be set to the sum of a PDCP header length, an RLC header length, and a MAC header length (e.g., 7 bytes) or an arbitrary value greater than the sum of the PDCP header length, RLC header length, and MAC header length. The X bytes may be determined by the UE or the network. It may be possible to map at least one segment of the unmapped pre-processed data to the remaining transmission resources. If the remaining uplink transmission resources are less than X bytes, the MAC entity 1*f*-40 may fill the remaining resources with padding without requesting segmentation. Although the remaining uplink transmission resources are greater than X bytes, if there is no more pre-processed data to transmit, the MAC entity 1*f*-40 may fill the remaining transmission resources with padding without requesting segmentation.

If it is necessary to insert padding, the MAC entity 1*f*-40 may insert 1-byte or 2-byte padding without a corresponding MAC sub-header or 3-byte or longer padding with a corresponding MAC sub-header at the end of the MAC PDU. Alternatively, it may be possible for the MAC entity 1*f*-40 to insert a 1-byte or 2-byte MAC sub-header instead of 1-byte or 2-byte padding or a 3-byte or longer padding with a corresponding sub-header at the end of the MAC PDU.

If the layer-specific header sizes (e.g., PDCP, RLC, and MAC header sizes) are fixed, the UE may use a hardware accelerator that is capable performing a repetitive and continuous task in order to increase the data pre-processing speed. That is, the header analysis, removal, and insertion process may be performed in hardware or software or a combination of both. In the above manner, it may be possible to accelerate processing of a header and data.

Figure 7A:
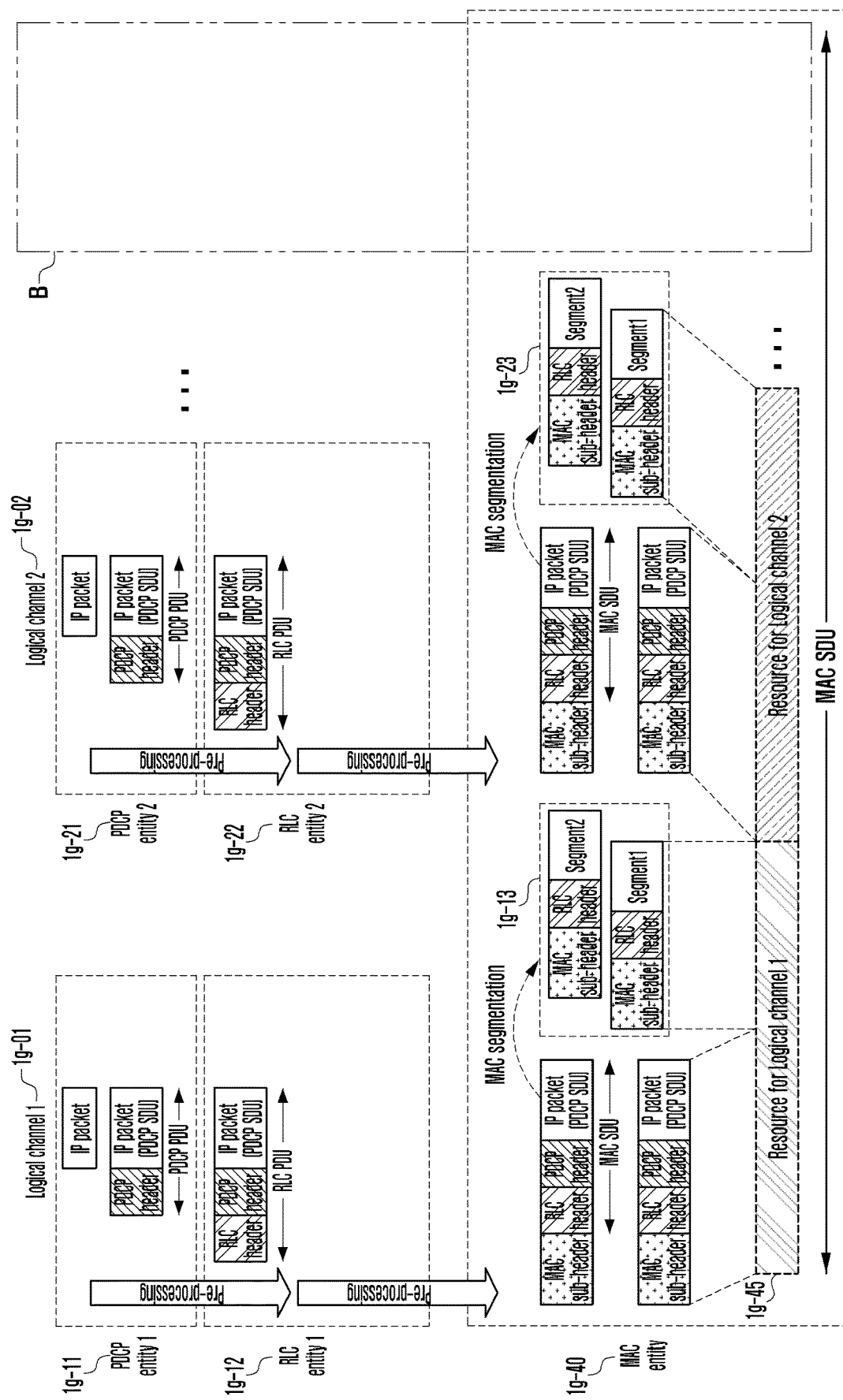
FIGS. 7A and 7B are diagrams illustrating a data pre-processing procedure for accelerating the data processing speed of an NR gNB or an NR UE according to embodiment 1-2 of the present disclosure.
Figure 7B:
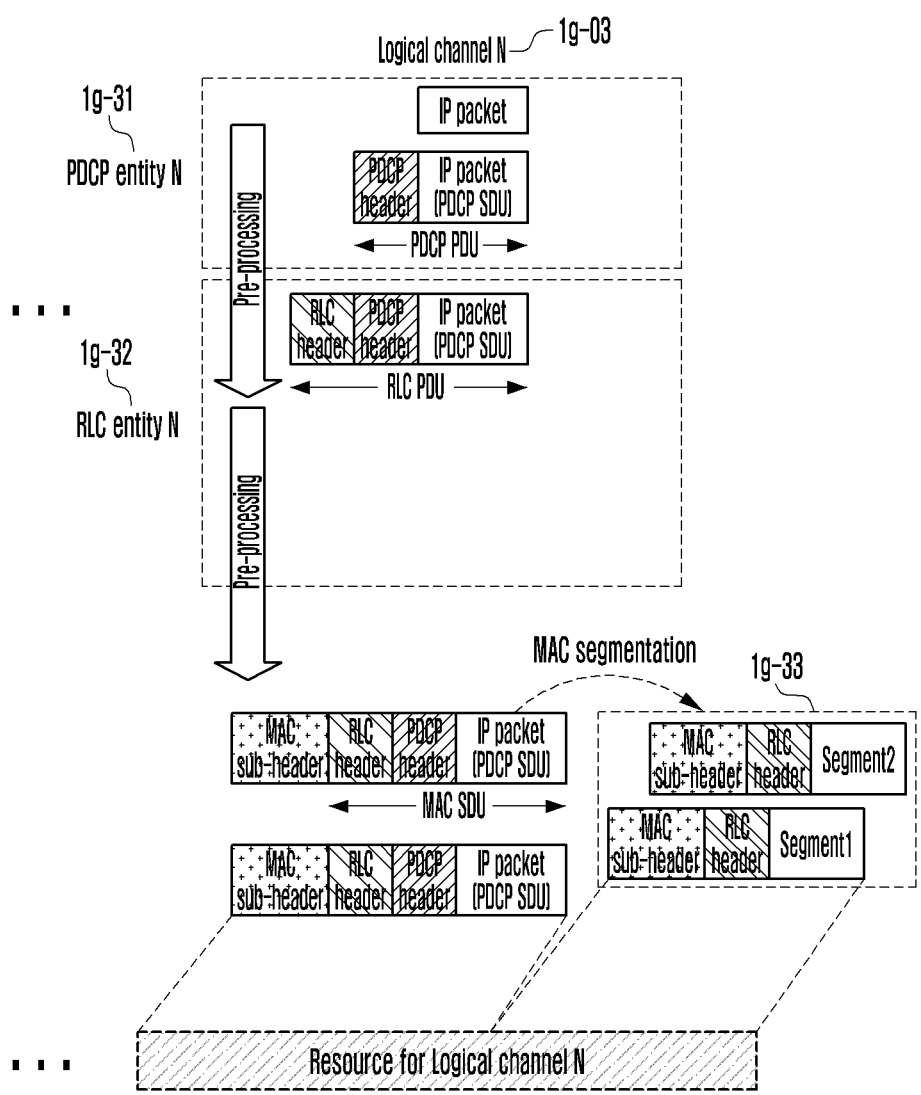

FIGS. 7A and 7B are diagrams illustrating a data preprocessing procedure for accelerating the data processing speed of an NR gNB or an NR UE according to embodiment 1-2 of the present disclosure.

In FIGS. 7A and 7B, a UE (or gNB) configures multiple logical channels (bearers). Specifically, the UE configures logical channel 1 1*g*-01, logical channel 2 1*g*-02, . . . , logical channel N 1*g*-03 (indicated by box B in FIG. 7A and shown in details in FIG. 7B). Each of the PDCP entities 1*g*-11, 1*g*-21, and 1*g*-31 of the respective logical channels 1*g*-01, 1*g*-02, and 1*g*-03 generates a PDCP PDU by adding a PDCP header to an IP packet received from an upper layer. PDCP entities 1*g*-11, 1*g*-21, and 1*g*-31 perform data pre-processing before being allocated resources for data transmission. The PDCP entities 1*g*-11, 1*g*-21, and 1*g*-31 may send the respective PDCP PDUs to the corresponding RLC entities 1*g*-12, 1*g*-22, and 1*g*-32 before being allocated resources for data transmission. For example, if a predetermined condition is configured, the PDCP entities 1*g*-11, 1*g*-21, and 1*g*-31 determine whether the predetermined condition is fulfilled and, if the condition is fulfilled, send their respective PDCP PDUs to the corresponding RLC entities 1*g*-12, 1*g*-22, and 1*g*-32 to continue data pre-processing. If the predetermined condition is not yet fulfilled, the PDCP entities 1*g*-11, 1*g*-21, and 1*g*-31 generate their respective PDCP PDUs but hold sending the PDCP PDUs to the corresponding RLC entities 1*g*-12, 1*g*-22, and 1*g*-32 until the predetermined condition is fulfilled. If no predetermined condition is configured, the PDCP entities 1*g*-11, 1*g*-21, and 1*g*-31 generate their PDCP PDUs and may send their PDCP PDUs to the RLC entities 1*g*-12, 1*g*-22, and 1*g*-32 without waiting to fulfill the predetermined condition.

The predetermined condition for sending preprocessed PDUs/SDUs to the next layer may be configured with a threshold or threshold value. For example, the threshold may be set to an arbitrary value or a value indicative of the size of a transport block (TB) that the MAC entity 1*g*-40 can transmit during a transmission time interval (TTI). When a threshold is configured, it may be possible to continue pre-processing data until the total amount of the pre-processed data becomes greater than the amount indicated by the threshold. The total amount of pre-processed data may be one of the amount of the pre-processed PDCP PDU, the amount of the pre-processed RLC PDU, or the amount of the pre-processed MAC SDUs and MAC sub-headers. Also, the total amount of pre-processed data may be one of a sum or a subset of the amount of the pre-processed PDCP PDU, the amount of the pre-processed to RLC PDU, or the amount of the pre-processed to MAC SDUs and MAC sub-headers, and data that are not pre-processed.

The threshold may also be an arbitrary value. The threshold value may be preconfigured or determined by the UE or acquired from an RRC message (or MAC CE or control signal) transmitted by the gNB (or network). The threshold value may be updated when the UE switches from one cell to another or when the gNB transmits an RRC connection reconfiguration message (RRCConnectionReconfiguration, see, e.g., see steps 1*n*-15 or 1*n*-35 of FIG. 15) to the UE. The threshold value may be updated when a UE capable of carrier aggregation (CA) adds or deletes a cell. For example, if the serving cell change is made from an old cell to a new cell, the UE may update the threshold to a maximum size of a TB that can be transmitted during the TTI of the new cell. When a new cell is configured (or added, activated) in addition to the old cell, the threshold may be updated to a value obtained by summing the maximum TB sizes of the old and new cells. When one of the previously configured (or activated) cells is deleted, the threshold may be updated to a value obtained by subtracting the maximum TB size of the deleted cell from the previous threshold.

The threshold or predetermined condition may be configured per logical channel. That is, the threshold or predetermined condition may be configured per logical channel in consideration of the type of bearer, QoS, priority, required data rate, and required transmission delay. The threshold or predetermined condition may be configured autonomously by the UE or according to an RRC message transmitted by the network in embodiments of the present disclosure.

The predetermined condition may be a request or part of a request generated by a MAC entity 1g-40. For example, the PDCP entities 1g-11, 1g-21, and 1g-31 may perform pre-processing upon receipt of a pre-processing request indicator generated by the MAC entity 1g-40. In this case, if there is no request from the MAC entity 1g-40, pre-processing is not performed. The pre-processing operation may be initiated by a MAC entity or, if a predetermined trigger condition is fulfilled in the UE, a controller (or processor) of the UE. The pre-processing operation may be configured by the gNB.

If the PDCP PDUs (RLC SDUs) are received from the PDCP entities 1g-11, 1g-21, and 1g-31, the RLC entities 1g-12, 1g-22, and 1g-32 may perform pre-processing on the data before being allocated resources for data transmission. For example, the RLC entities 1g-12, 1g-22, and 1g-32 may generate RLC PDUs and send them to the MAC entity 1g-40 before being allocated the resources for data transmission. In the case where a predetermined condition is configured, the RLC entities 1g-12, 1g-22, and 1g-32 generate, when the predetermined condition is fulfilled, RLC PDUs by adding RLC headers to the PDCP PDUs and send the RLC PDUs to the MAC entity 1g-40 to continue pre-processing. If the predetermined condition is not fulfilled, the RLC entities 1g-12, 1g-22, and 1g-32 store the PDCP PDUs (RLC SDUs) in buffers and wait until the predetermined condition is fulfilled. If no condition is configured, the RLC entities 1g-12, 1g-22, and 1g-32 may send the RLC PDUs to the MAC entity 1g-40 immediately upon generation/creation.

The predetermined condition may be configured with a threshold. For example, the threshold may be set to a maximum TB size available by the MAC entity 1g-40 in one TTI or an arbitrary value. In the case that the threshold is configured, it may be possible to continue pre-processing data until the total amount of the pre-processed data becomes greater than the amount indicated by the threshold. The total amount of pre-processed data may mean only the data amount pre-processed to the PDCP PDU, only the data amount pre-processed to the RLC PDU, or only the data amount pre-processed to the MAC SDUs and MAC sub-headers. Also, the total amount of pre-processed data may be a subset of the set of data amount pre-processed to PDCP PDU, data amount pre-processed to RLC PDU, data amount pre-processed to MAC SDUs and MAC sub-headers, and data that are not pre-processed. It may also be an arbitrary value.

The threshold value may be preconfigured or determined by the UE or acquired from an RRC message (or MAC control element (CE) or control signal) transmitted by the gNB (or network). The threshold value may be updated when the UE switches from one cell to another or when the gNB transmits an RRC connection reconfiguration (RRC-ConnectionReconfiguration) message (e.g., see step 1n-35 of FIG. 15) to the UE. The threshold value may be updated when a UE capable of carrier aggregation (CA) adds or deletes a cell. For example, if the serving cell change is made from an old cell to a new cell, the UE may update the threshold to a maximum size of a TB that can be transmitted during the TTI of the new cell. In the case where a new cell is configured (or added, activated) in addition to the old cell, it may be possible to update the threshold to a value obtained by summing the maximum TB sizes of the old and new cells. In the case where one of previously configured (or activated) cells is deleted, it may be possible to update the threshold to a value obtained by subtracting the maximum TB size of the deleted cell from the previous threshold.

The threshold or condition may be configured per logical channel. That is, the threshold or condition may be configured per logical channel in consideration of the type of bearer, QoS, priority, required data rate, and required transmission delay. The threshold or condition may be configured autonomously by the UE or according to an RRC message transmitted by the network according to embodiments of the present disclosure.

If the RLC PDUs are received from the RLC entities 1g-12, 1g-22, and 1g-32, the MAC entity 1g-40 may perform pre-processing to generate MAC sub-headers corresponding to the MAC SDUs (RLC PDUs). If necessary, the MAC entity 1g-40 may use a predetermined condition or threshold as described above in association with the PDCP entities 1g-11, 1g-21, and 1g-31 and the RLC entities 1g-12, 1g-22, and 1g-32.

The MAC entity 1g-40 may store the pre-processed data and, if transmission resources are allocated (after requesting transmission resources), assigns predetermined sizes of resources per logical channel using the allocated transmission resources. The pre-processed data may be configured to fit the assigned resources for each of logical channels 1g-01, 1g-02, . . . , 1g-03. It may be possible to configure a MAC SDU 1g-45 with the pre-processed data of the logical channels 1g-01, 1g-02, and 1g-03. If the pre-processed data is greater than the transmission resources assigned for a certain logical channel, it may be necessary to perform segmentation. That is, if the resources allocated per logical channel are not enough to accommodate the pre-processed data, it may be necessary for the MAC entity 1g-40 to perform a segmentation operation to fill the resource unit with as much pre-processed data as possible and then fill any remaining space with one or more segments of the remaining pre-processed data.

The segmentation operation may be performed by other layers in response to a request from the MAC entity 1g-40. The MAC entity 1g-40 may update the RLC header and MAC sub-headers corresponding to the segments as denoted by reference numbers 1g-13, 1g-23, and 1g-33 and fill the remaining space of the uplink transmission resources with at least one of the segments to generate the MAC PDU. In the case that the segmentation operation is performed in the MAC layer, it may be necessary to send the information on the segments to the RLC entities 1g-12, 1g-22, and 1g-32 for use in performing an automatic repeat request (ARQ) function. For example, it may be necessary to insert or update a field indicative of the segmentation (e.g., a framing information (FI) field, a segment information (SI) field, a last segment flag (LSF) and/or another field conveying information indicating a segmenting point of the data) in the RLC header and update the length field of the MAC header because the length of a MAC SDU is changed by segmentation (or insert segmentation-related information conveying the updated MAC header length).

When a MAC CE is configured, the MAC entity 1g-40 generates the MAC PDU including the MAC CE and corresponding MAC sub-header along with the pre-processed data. The MAC entity 1g-40 of a UE may generate the MAC PDU by arranging the MAC CEs and MAC SDUs in their generation order or according to a predetermined order. It may be possible to apply at least one of the following rules: placing MAC CE at the beginning of MAC PDU, placing MAC CE at the end of MAC PDU, placing MAC CE before MAC SDU, placing MAC CE before or after MAC PDU depending on the characteristics of MAC CE, and/or determining a position of MAC CE arbitrarily depending on implementation of the UE.

The MAC entity 1g-40 maps the pre-processed data (e.g., MAC SDUs and MAC sub-headers) to the uplink transmission resources (TB size) allocated by the gNB without segmentation. If the resources remaining after mapping the pre-processed data to the uplink transmission resources is greater than X bytes (i.e., a threshold) and if there is unmapped pre-processed data, the MAC entity 1g-40 may perform segmentation on the unmapped pre-processed data. The X bytes may be set to the sum of a PDCP header length, an RLC header length, and a MAC header length, e.g., 7 bytes, or an arbitrary value greater than the sum of the PDCP header length, RLC header length, and MAC header length. The X bytes may be determined by the UE or the network. It may be possible to map at least one segment of the unmapped pre-processed data to the remaining transmission resources. If the remaining uplink transmission resources are less than X bytes, the MAC entity 1g-40 may fill the remaining resources with padding without performing segmentation. Although the remaining uplink transmission resources are greater than X bytes, if there is no more pre-processed data to transmit, the MAC entity 1g-40 may fill the remaining transmission resources with padding without performing segmentation.

If it is necessary to insert padding, the MAC entity 1g-40 may insert 1-byte or 2-byte padding without a corresponding MAC sub-header or 3-byte or longer padding with a corresponding MAC sub-header at the end of the MAC PDU. Alternatively, it may be possible for the MAC entity 1g-40 to insert a 1-byte or 2-byte MAC sub-header instead of 1-byte or 2-byte padding or a 3-byte or longer padding with a corresponding MAC sub-header at the end of the MAC PDU.

If the layer-specific header sizes (e.g., PDCP, RLC, and MAC header sizes) are fixed, the UE may use a hardware accelerator that is capable performing a repetitive and continuous task in order to increase the data pre-processing speed. That is, the header analysis, removal, and insertion process may be performed in hardware or software or a combination of both. In the above manner, it may be possible to accelerate processing of a header and data.

According to various embodiments of the preset disclosure, the data pre-processing procedure of embodiments 1-1 and 1-2 may be performed or not performed for predetermined services, especially a service requiring no high data rate, according to a command from the network, or for the purpose of saving battery power of the UE. That is, the data pre-processing operation may be optionally enabled depending on a service, in response to a request, or in case of need at a UE.

Figure 8:
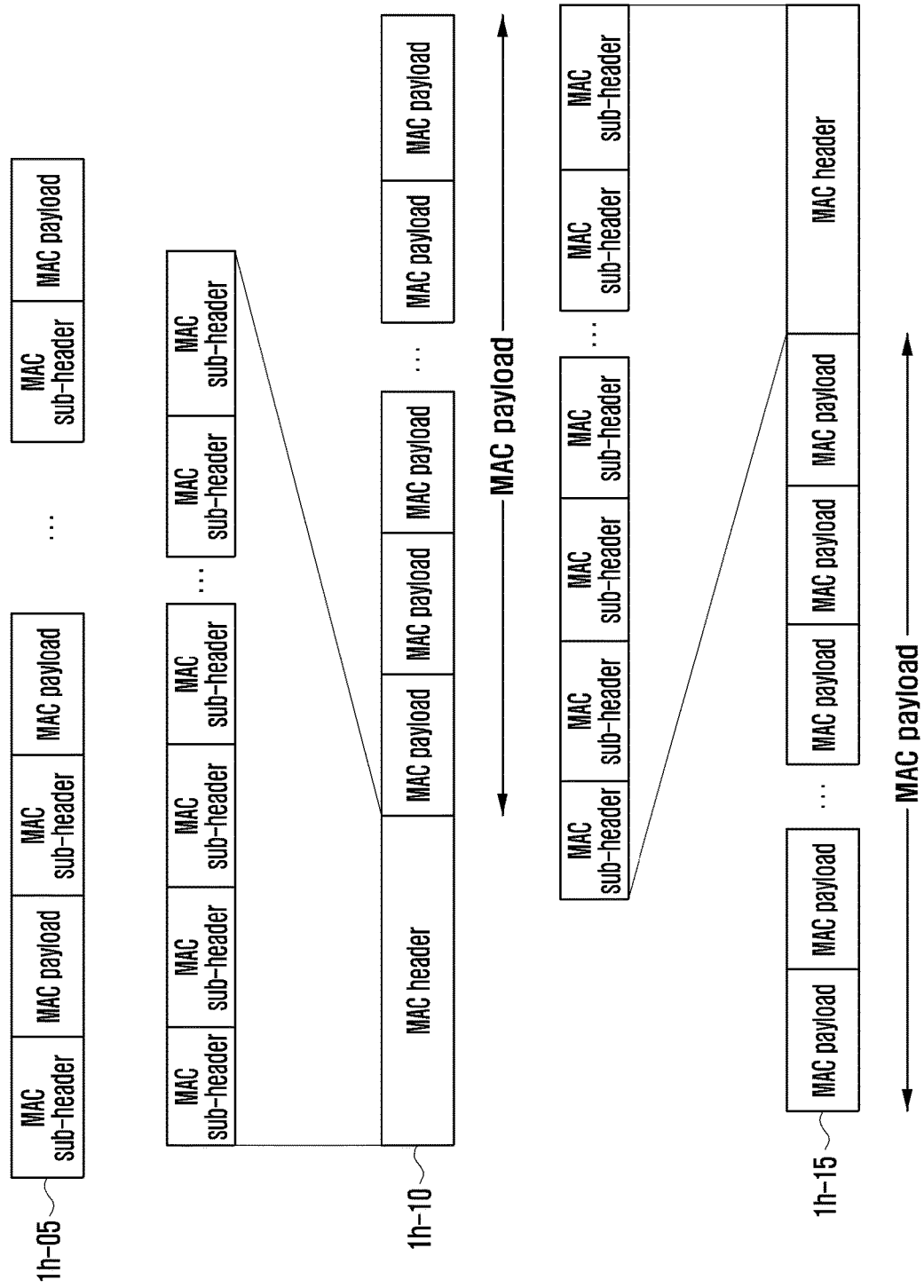
FIG. 8 is a diagram illustrating MAC PDU formats for data pre-processing methods of a UE in a next generation mobile communication system according to an embodiment of the present disclosure.

FIG. 8 is a diagram illustrating MAC PDU formats for data pre-processing methods of a UE in a next generation mobile communication system according to an embodiment of the present disclosure.

In FIG. 8, MAC PDU format 1h-05 is configured with each MAC sub-header and its corresponding MAC payload arranged together, and MAC PDU format 1h-10 is configured with the MAC sub-headers at the beginning of the MAC PDU, i.e., as part of the MAC header, and the MAC payloads fill the remaining space of the MAC PDU. MAC PDU format 1h-15 is configured with the MAC header including the MAC sub-headers at the end of the MAC PDU and the MAC payloads starting at the beginning of the MAC PDU.

The MAC PDU formats 1h-05, 1h-10, and 1h-15 may be used by the MAC layer of FIGS. 6A and 6B in the data pre-processing method for accelerating the data processing speed of the UE in the next generation mobile communication system according to embodiment 1-1 of the present disclosure. The MAC PDU formats may also be used by the MAC layer of FIGS. 7A and 7B in the data pre-processing method for accelerating the data processing speed of the UE in the next generation mobile communication system according to embodiment 1-2 of the present disclosure.

Figure 9:
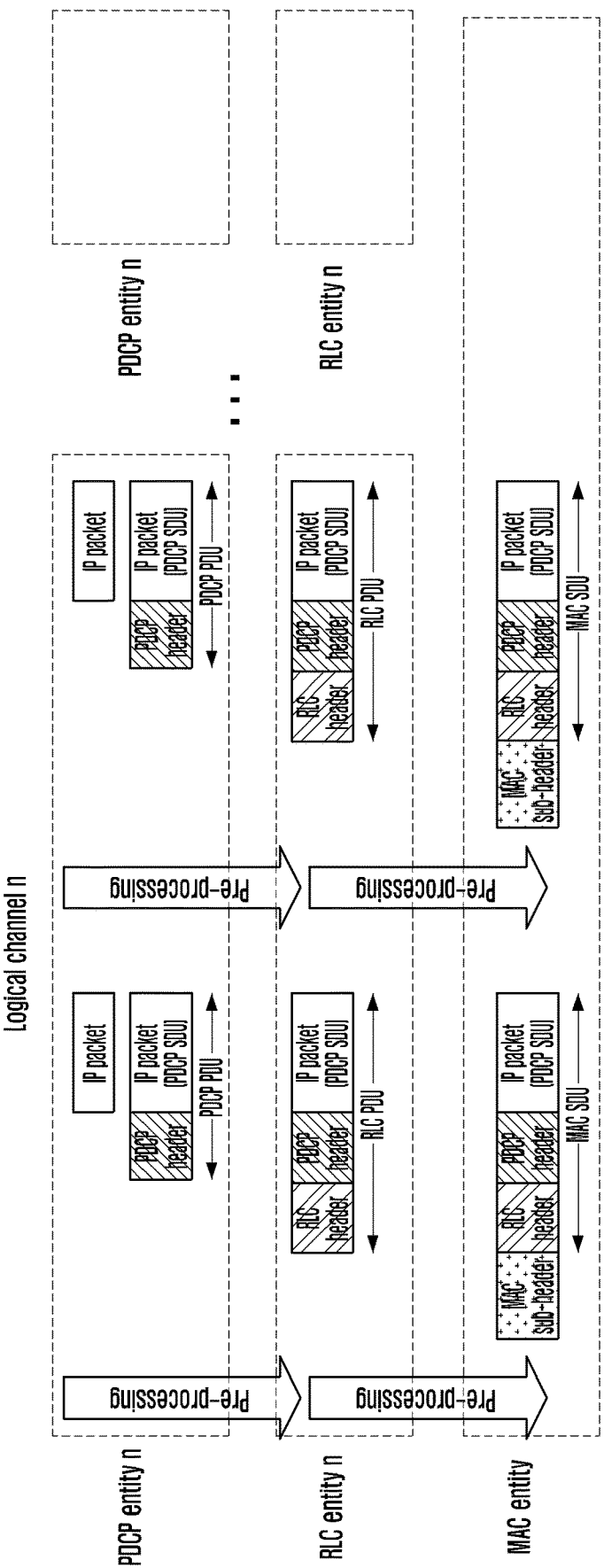
FIG. 9 is a diagram illustrating a data pre-processing method for accelerating the data processing speed of a UE in a next generation mobile communication system according to embodiment 2 of the present disclosure.

FIG. 9 is a diagram for illustrating a data pre-processing method for accelerating the data processing speed of a UE in a next generation mobile communication system according to embodiment 2 of the present disclosure.

Embodiment 2 of the present disclosure may further accelerate data processing speed in comparison with the methods of embodiments 1-1 and 1-2 described with reference to FIGS. 6A-6B and 7A-7B. In embodiment 2, the UE makes a more efficient use of processors (microprocessors) by performing the data pre-processing in parallel operations in pipe-line mode, which may be implemented in proportion to the capacity of available processors. If the capacity of the available processors is enough, it is possible to increase the data processing speed by performing the data pre-processing in multiple parallel operations in pipe-line mode within a logical channel, as shown in FIG. 9. Embodiment 2 is characterized by parallel data pre-processing. The method of embodiment 2, i.e., parallel processing, may be applied to embodiments 1-1 and 1-2.

Figure 10:
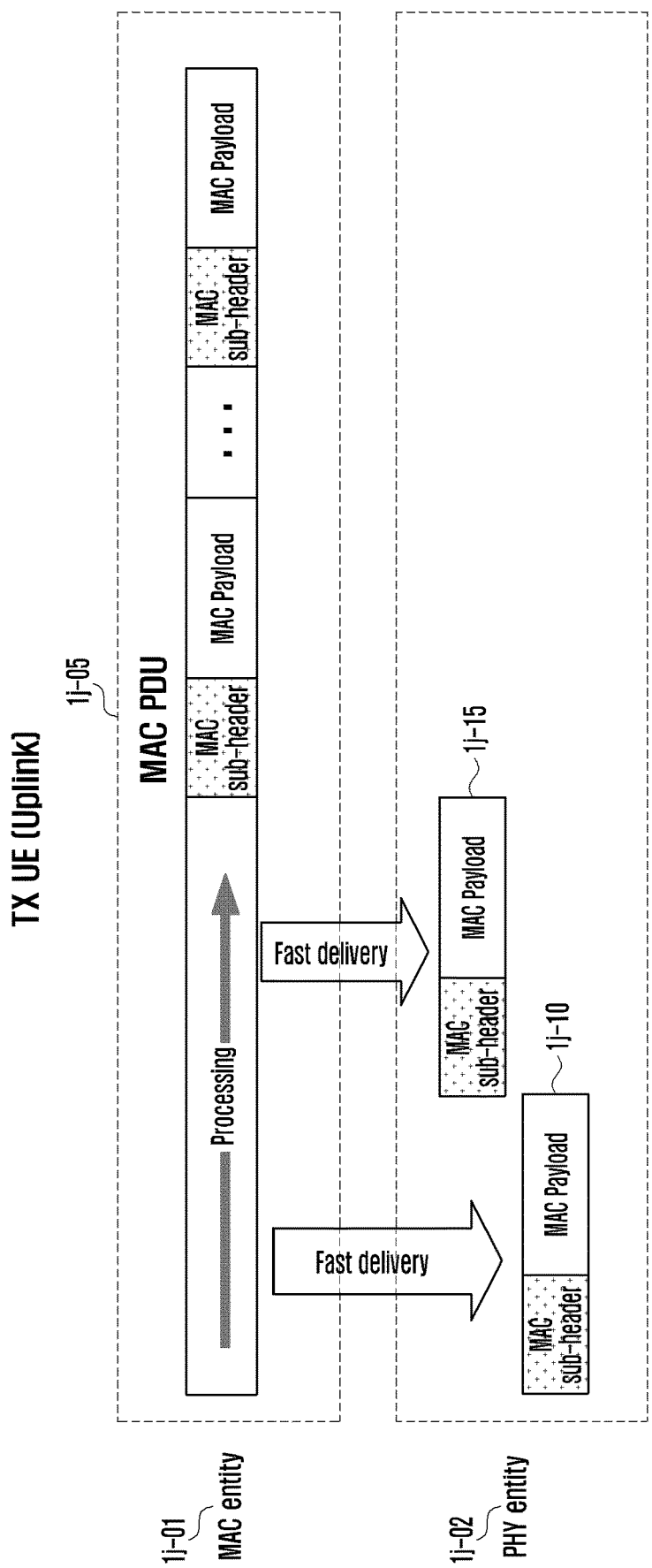
FIG. 10 is a diagram illustrating a data pre-processing method of a UE in a next generation mobile communication system according to embodiment 3-1 of the present disclosure.

FIG. 10 is a diagram illustrating a data pre-processing method of a UE in a next generation mobile communication system according to embodiment 3-1 of the present disclosure.

In FIG. 10, the UE performs fast delivery data pre-processing for uplink data transmission. In the UE, a MAC layer/entity 1j-01 generates pre-processed MAC PDUs. The MAC layer/entity 1j-01 sends the MAC sub-headers and corresponding MAC payload 1j-10 and 1j-15 to the PHY layer/entity 1j-02 in their (processing/pre-processing) creation or configuration order as pieces of the MAC PDU. Because the MAC layer/entity 1j-01 sends MAC payloads with their corresponding MAC sub-headers to the PHY entity 1j-02 as they are created/configured by MAC layer/entity 1j-01, the PHY entity 1j-02 may start to perform data processing before receiving the entire MAC PDU. Each of the MAC payloads may be a MAC CE, a MAC SDU, and/or padding. The data processing acceleration method of embodiment 3-1 may be applied to the downlink data transmission operation as well (for either a gNB or a UE). The data processing acceleration method of embodiment 3-1 may be combined with one or more of the methods of embodiments 1-1, 1-2, and 2 of the present disclosure.

If the layer-specific header sizes (e.g., PDCP, RLC, and MAC header sizes) are fixed, the UE may use a hardware accelerator that is capable performing repetitive and continuous tasks in order to increase the data pre-processing speed. That is, the header analysis, removal, and insertion process described above may be performed in hardware or software or a combination of both. In the above manner, it may be possible to accelerate processing of a header and data.

Figure 11:
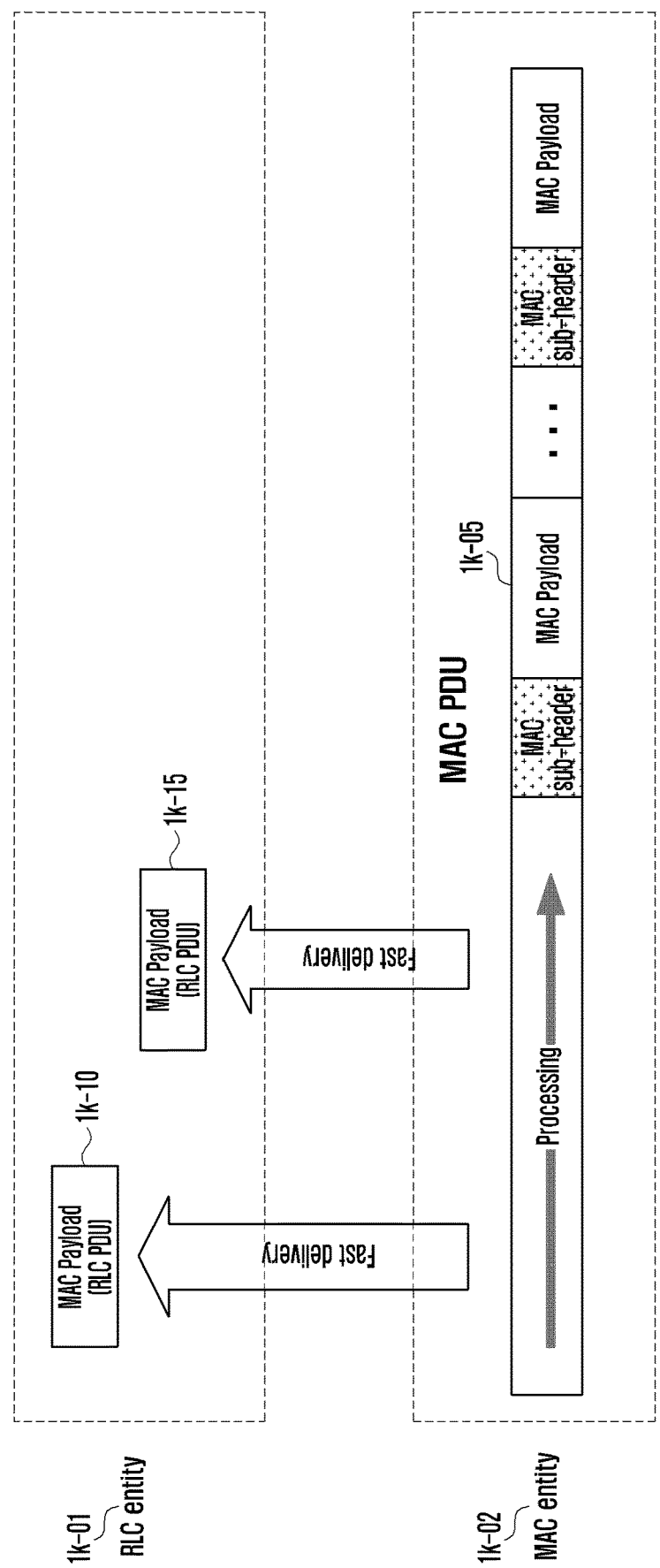
FIG. 11 is a diagram illustrating a data pre-processing method of a UE in a next generation mobile communication system according to embodiment 3-2 of the present disclosure.

FIG. 11 is a diagram illustrating a data pre-processing method of a UE in a next generation mobile communication system according to embodiment 3-2 of the present disclosure.

In FIG. 11, the UE performs fast delivery data pre-processing for receiving downlink data. In the UE, a MAC layer/entity 1k-02 processes the MAC sub-headers and respective MAC payloads contained in a received MAC PDU and generates and delivers the corresponding RLC PDUs (i.e., the MAC payloads or MAC SDUs) as the process result to RLC layer/entity 1k-01 as shown in FIG. 11. Because the MAC layer/entity 1k-02 processes the MAC sub-headers and MAC payloads and delivers a processed MAC payload to the RLC entity 1k-01 while processing the MAC PDU, the RLC entity may perform data processing earlier than if waiting for the entire MAC PDU to be processed by MAC layer/entity 1k-02. Each of the MAC payloads may be a MAC CE, MAC SDU, and/or padding. The data processing acceleration method of embodiment 3-2 may be applicable to a gNB as a receiver of uplink data. As with the previous methods, if the layer-specific header sizes (e.g., PDCP, RLC, and MAC header sizes) are fixed, the UE may use one or more hardware accelerators to increase data pre-processing speed. That is, the header analysis, removal, and insertion process may be performed in hardware or software or a combination of both.

Figure 12:
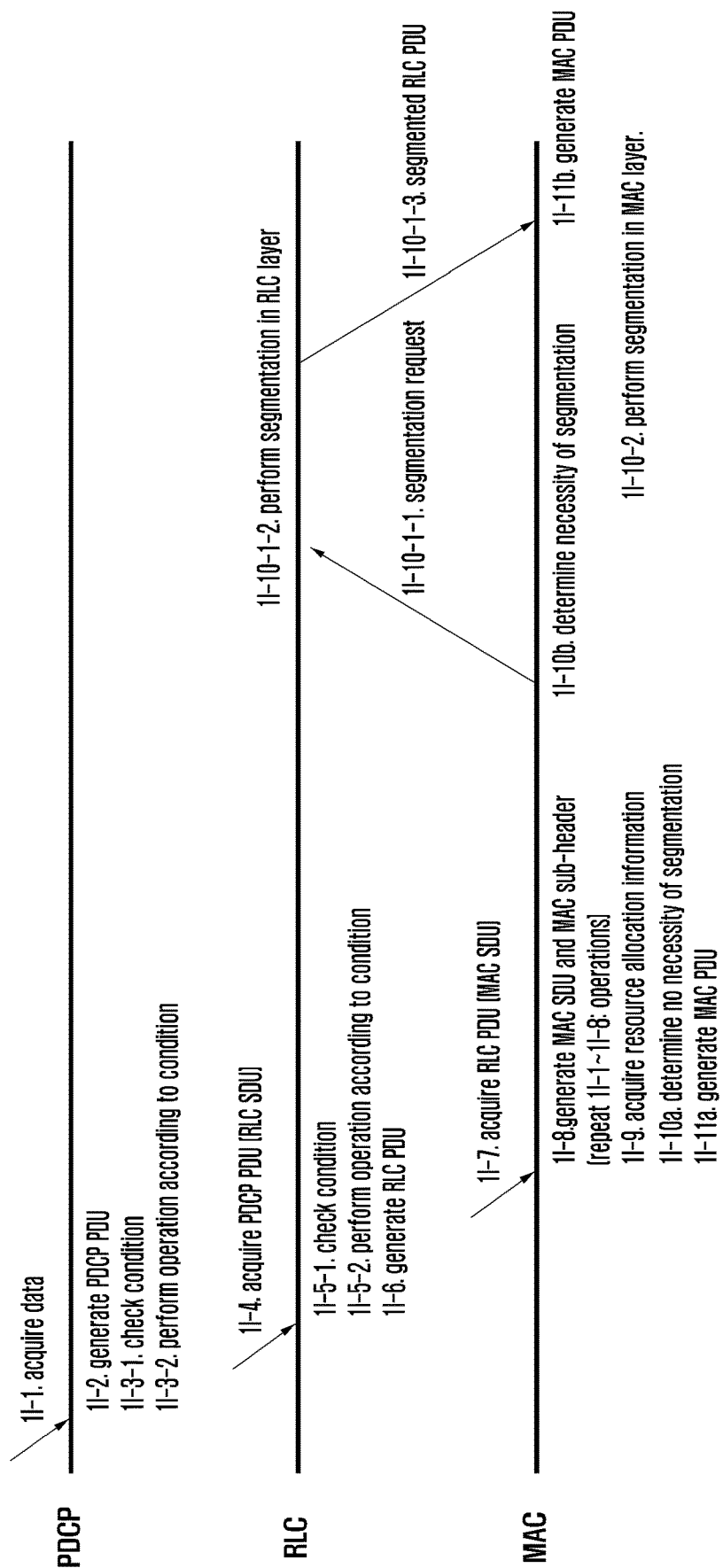
FIG. 12 is a diagram illustrating operations of layer-specific entities in a data pre-processing procedure for accelerating the data processing speed of a gNB or a UE according to an embodiment of the present disclosure.

FIG. 12 is a diagram illustrating operations of layer-specific entities in a data pre-processing procedure for accelerating the data processing speed of a gNB or a UE according to an embodiment of the present disclosure.

In FIG. 12, a PDCP entity receives data from the upper layer at step 1*l* in a transmitting device. In the transmitting device, at least one logical channel is established, and the received data corresponds to one of the at least one logical channel. The PDCP entity performs data pre-processing to generate a PDCP PDU at step 1*l*-2. The PDCP entity generates a PDCP PDU by adding a PDCP header to the received data. The PDCP entity sends the PDCP PDU to an RLC entity at step 1*l*-04.

In addition, as shown in FIG. 12, the PDCP entity may perform steps 1*l*-3-1 and 1*l*-3-2 if a predetermined condition is configured. At step 1*l*-3-1, the PDCP entity determines whether the predetermined condition is configured. If it is determined that a predetermined condition is configured, the PDCP entity performs the predetermined condition-based operation in step 1*l*-3-2. Specifically, the PDCP entity sends the pre-processed data to the RLC entity when the predetermined condition is configured and holds sending the pre-processed data until the pre-determined condition is configured when the predetermined condition is not presently configured.

At step 1*l*-4, the RLC entity receives the PDCP PDU (RLC SDU) from the PDCP entity. The RLC entity generates an RLC PDU at step 1*l*-6 based on at least one of the PDCP header and the PDCP SDU in the received PDCP PDU.

In addition, as shown in FIG. 12, the RLC entity may perform steps 1*l*-5-1 and 1*l*-5-2 if a predetermined condition is configured. At step 1*l*-5-1, the RLC entity determines whether the predetermined condition is configured. If it is determined that the predetermined condition is configured, the RLC entity performs the predetermined condition-based operation in step 1*l*-5-2. Specifically, the RLC entity sends the preprocessed data to the MAC entity when the predetermined condition is configured and holds sending the preprocessed data until the predetermined condition is configured when the predetermined condition is not presently configured.

The RLC entity sends the RLC PDU to the MAC entity at step 1*l*-7. At step 1*l*-8, the MAC entity generates a MAC SDU and corresponding MAC sub-header based on the received RLC PDU. The transmitting device may continuously repeat steps 1*l*-1 to 1*l*-8. Steps 1*l*-1 to 1*l*-8 may be performed on multiple logical channels, on multiple data packets, and/or in parallel.

At step 1*l*-9, the transmitting device acquires resource allocation information, from which resource allocation information for transmitting data is subsequently received by the MAC entity of the transmitting device. The transmitting device may operate differently depending on whether segmentation is necessary for configuring MAC PDUs. Accordingly, the next step is determining either that segmentation is not necessary (step 1*l*-10*a*) or that segmentation is necessary (step 1*l*-10*b*).

At step 1*l*-10*a*, the MAC entity determines that segmentation is not necessary for the pre-processed data, and the MAC entity generates a MAC PDU at step 1*l*-11. The transmitting device transmits the MAC PDU using allocated resources. At step 1*l*-10*b*, the MAC entity determines that segmentation is necessary. The segmentation may be performed by the RLC entity or the MAC entity.

If it is determined at step 1*l*-10*b* that segmentation is necessary, and segmentation is performed by the RLC entity, the MAC entity sends a segmentation request to the RLC entity at step 1*l*-10-1-1. In response, the RLC entity segments the RLC PDU and updates the RLC header at step 1*l*-10-1-2. The RLC entity sends the RLC PDU reconfigured with the segments to the MAC entity at step 1*l*-10-1-3. The MAC entity updates the MAC sub-header based on the received RLC PDU reconfigured with the segments to generate the MAC PDU at step 1*l*-11*b*.

If it is determined at step 1*l*-10*b* that segmentation is necessary, and segmentation is performed by the MAC entity, the MAC entity performs segmentation autonomously at step 1*l*-10-2. In this case, the MAC entity updates the RLC header and notifies the RLC entity of the segmentation result. The MAC entity updates the MAC sub-headers and reconfigures the MAC PDU with the segmented RLC PDUs.

Figure 13:
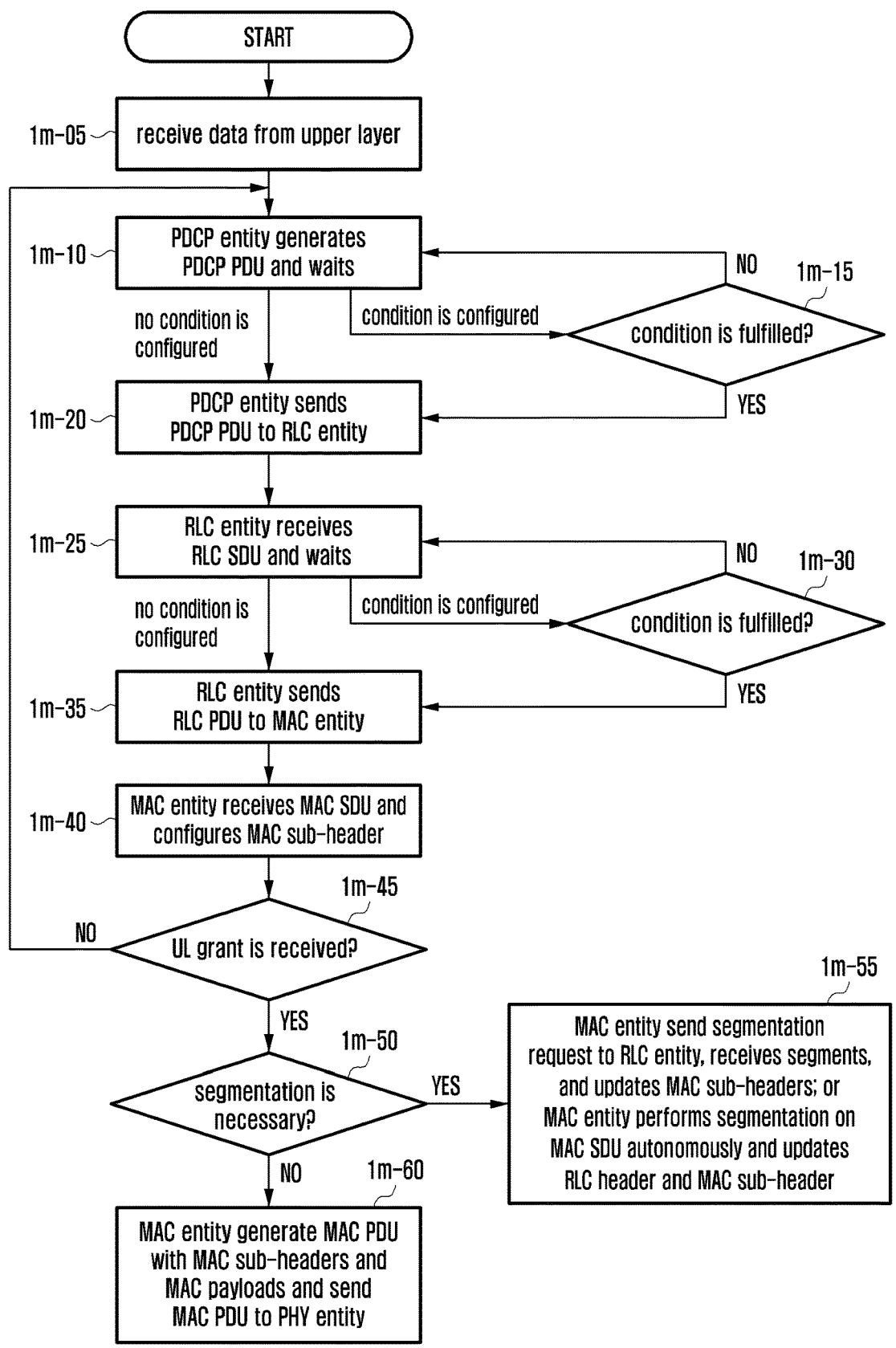
FIG. 13 is a flowchart illustrating a data pre-processing method for accelerating the data processing speed of a UE according to an embodiment of the present disclosure.

FIG. 13 is a flowchart illustrating a data pre-processing method for accelerating the data processing speed of a UE according to an embodiment of the present disclosure. The UE may be configured with one or more logical channels (bearers). For example, the UE may have logical channel 1, logical channel 2, . . . , logical channel N.

In step 1*m*-05, a PDCP entity in the UE receives a data packet from an upper layer. When a PDCP entity is established per each logical channel, each PDCP entity may receive a data packet from the upper layer. The PDCP entity generates a PDCP PDU at step 1*m*-10 by adding a PDCP header to the data packet before the UE is allocated resources for data transmission.

The PDCP entity determines at step 1*m*-10 whether a predetermined condition is configured and, if so, determines at step 1*m*-15 whether the pre-determined condition is fulfilled. If it is determined at step 1*m*-15 that the predetermined condition is fulfilled, the PDCP entity sends the PDCP PDU to an RLC entity at step 1*m*-20. If it is determined at step 1*m*-15 that the condition is not fulfilled, the PDCP entity returns to step 1*m*-10 and holds sending the PDCP PDU to the RLC entity until the predetermined condition is fulfilled. If no predetermined condition is configured, the PDCP entity sends the PDCP PDU to the RLC entity at step 1m-20.

The predetermined condition may be configured with a threshold. The threshold may be configured as described in embodiments 1-1 and 1-2. The predetermined condition may be a request from a MAC entity. The MAC entity may make a request for fulfilling the condition as described in embodiments 1-1 and 1-2.

At step 1m-25, the RLC entity receives the PDCP PDU (RLC SDU) from the PDCP entity. The RLC entity determines at step 1m-25 whether a predetermined condition is configured and, if so, determines at step 1m-30 whether the predetermined condition is fulfilled. If it is determined at step 1m-30 that the predetermined condition is fulfilled, the method proceeds to step 1m-35. At step 1m-35, the RLC entity adds an RLC header to the RLC SDU to generate an RLC PDU and sends it to the MAC entity. The RLC entity continues data pre-processing. If it is determined at step 1m-30 that the predetermined condition is not fulfilled, the procedure returns to step 1m-25 and holds sending the RLC PDU to the MAC entity until the predetermined condition is fulfilled. The RLC entity may store the PDCP PDU (RLC SDU) in a buffer while waiting until the predetermined condition is fulfilled. If it is determined no predetermined condition is configured at step 1m-10, the RLC entity generates the RLC PDU and sends the generated RLC PDU to the MAC entity at step 1m-35.

The predetermined condition may be configured with a threshold. The threshold may be configured as described in embodiments 1-1 and 1-2. The predetermined condition may be a request from the MAC entity. The MAC entity may make a request for fulfilling the condition as described in embodiments 1-1 and 1-2.

At step 1m-40, the MAC entity generates a MAC sub-header corresponding to the RLC PDU (MAC SDU) sent by the RLC entity and perform pre-processing on the MAC SDU and corresponding MAC sub-header. In some embodiments, a predetermined condition may be configured for the operation of the MAC entity as described with reference to the PDCP entity (step 1m-15) and the RLC entity (step 1m-30).

The MAC entity holds sending the pre-processed data to a PHY entity until the UE is allocated resources for data transmission at step 1m-45. That is, the MAC entity determines at step 1m-45 whether an uplink grant is received. Although step 1m-45 follows step 1m-40 in the drawing, the MAC entity may perform the operation of step 1m-45 anytime during the data pre-processing procedure. If it is determined that an uplink grant is received in step 1m-45, the method proceeds to step 1m-50; if it is determined that no uplink grant is received, the method returns to step 1m-10.

In an embodiment where the UE maps the pre-processed data to allocated transmission resources per logical channel through a predetermined process, the MAC entity may assign the transmission resources per logical channel. The MAC entity may configure the pre-processed data to fit the resources assigned per logical channel. The MAC entity may generate a MAC PDU with the data pre-processed per logical channel.

At step 1m-50, the MAC entity may determine whether segmentation is necessary. If the pre-processed data does not completely fill the transmission resources assigned for a certain logical channel, it may be necessary to perform segmentation. If it is determined that segmentation is not necessary at step 1m-50, the method proceeds to step 1m-60, discussed further below.

If it is determined that segmentation is necessary at step 1m-50, the method proceeds to step 1m-55. That is, if a resource unit allocated per logical channel is not enough to accommodate the pre-processed data, it may be necessary for the MAC entity to perform a segmentation operation to fill the resource unit with as much pre-processed data as possible and then fill the remaining space in the resource unit with one or more segments of the remaining pre-processed data. For more detail, see the descriptions made above in regards to embodiments 1-1 and 1-2 of the present disclosure. In step 1m-55, the segmentation operation may be performed by the RLC entity or the MAC entity. The MAC entity may request to the RLC entity for segmentation and, in this case, the RLC entity performs segmentation and sends RLC PDUs generated with segments and corresponding RLC headers to the MAC entity such that the MAC entity updates MAC sub-headers corresponding to the new RLC PDUs and fills the remaining space with the new MAC SDUs and corresponding MAC sub-headers.

Otherwise, in step 1m-55, the MAC entity may perform the segmentation operation autonomously in such a way of updating the RLC headers and MAC sub-headers of the new MAC SDUs configured with the segments and fills the remaining space with the new MAC SDUs and corresponding MAC sub-headers to generate the MAC PDU. For example, it may be necessary to insert or update a field indicative of the segmentation (e.g., a framing information (FI) field, a segment information (SI) field, a last segment flag (LSF), and/or another field conveying information indicating segmenting point of data) in the RLC header and update the length field of the MAC header because the length of a MAC SDU is changed by segmentation (or insert segmentation-related information).

If it is determined that segmentation is not necessary at step 1m-50, the method proceeds to step 1m-60, where the MAC entity generates a MAC PDU and sends the MAC PDU to the PHY entity. If it is necessary to configure a MAC CE, the MAC entity may generate the MAC PDU including the MAC CE and corresponding MAC sub-header along with the pre-processed data. The MAC PDU including a MAC CE may be generated as described above.

The MAC entity may map the pre-processed data (e.g., MAC SDUs and MAC sub-headers) to the uplink transmission resources (TB size) allocated by the gNB without segmentation. If the resources remaining after mapping the pre-processed data to the uplink transmission resources is greater than X bytes and if there is unmapped pre-processed data, the MAC entity may request the RLC entity to perform segmentation on the pre-processed data. It may also be possible for the MAC entity to perform segmentation autonomously. It may be possible to map at least one segment to the remaining transmission resources. If the remaining uplink transmission resources are less than X bytes, the MAC entity may fill the remaining resources with padding without performing segmentation. Although the remaining uplink transmission resources are greater than X bytes, if there is no more pre-processed data to transmit, the MAC entity may fill the remaining transmission resources with padding without performing segmentation. The X bytes may be set to the sum of a PDCP header length, an RLC header length, and a MAC header length, e.g., 7 bytes, or an arbitrary value greater than the sum of the PDCP header length, RLC header length, and MAC header length. The X bytes may be determined by the UE or the network. If it is necessary to insert padding, the MAC entity may insert padding into the MAC PDU. The detailed method of inserting padding into the MAC PDU has been described above and is omitted herein.

Figure 14:
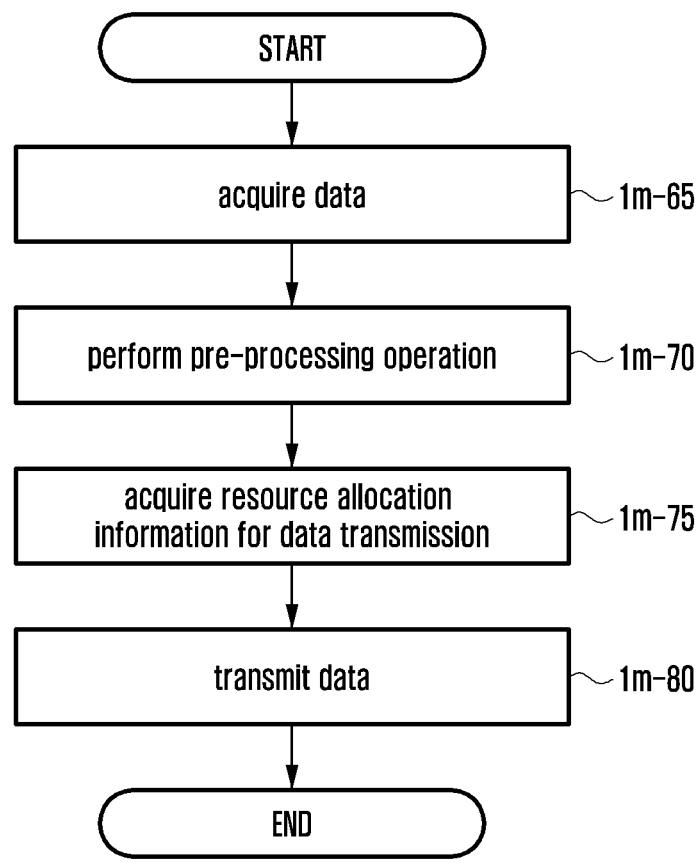
FIG. 14 is a flowchart illustrating a data transmission procedure of a transmitting device according to an embodiment of the present disclosure.

FIG. 14 is a flowchart illustrating a data transmission procedure of a transmitting device according to an embodiment of the present disclosure.

In FIG. 14, the transmitting device acquires data to be transmitted at step 1m-65. For example, the transmitting device may receive a data packet from an upper layer device.

At step 1m-70, the transmitting device performs a pre-processing operation. The transmitting device may be configured with a predetermined condition for performing the pre-processing operation. If the predetermined condition is configured, the pre-processing operation is triggered when the predetermined condition is fulfilled.

The pre-processing operation may be performed by at least one of a PDCP entity, an RLC entity, a MAC entity, and a PHY entity of the transmitting device. For example, the transmitting device may perform at least one, but not necessarily all, of the operations of steps 1m-10 to 1m-40 of FIG. 13. The layer-specific pre-processing operations may be performed as described above. The pre-processing operations of the transmitting device mean the operations being performed on at least one of the protocol layers to process the data to be transmitted before the transmitting device is allocated resources for use in transmitting the data. Unlike the legacy data processing procedure in which the PDCP entity generates PDCP PDUs when the resource allocation information for transmitting data is received, the present data transmission procedure is characterized in that the PDCP entity may generate PDCP PDUs to an RLC entity, the RLC entity may generate RLC PDUs to a MAC entity, and/or the MAC entity may generate MAC SDUs and corresponding MAC sub-headers, before the transmitting device receives the resource allocation information for data transmission.

At step 1m-75, the transmitting device receives the resource allocation information for transmitting data. If the transmitting device is a UE, the resource allocation information may be an uplink (UL) grant for allocating resources for uplink transmission. If the transmitting device is a gNB, the resource allocation information may be a downlink (DL) assignment or, in the configuration where the gNB is assigned downlink resources from a high-level node, DL resource allocation information, for allocating resources for downlink transmission. In the case that the transmitting device is the gNB, the resource allocation information may correspond to a DL scheduling decision. Once the resource allocation information is received, the MAC entity acquires the resource allocation information and generates a MAC PDU with the pre-processed MAC sub-headers and MAC SDUs. As the data to be transmitted are pre-processed before receiving the resource allocation information, unlike the legacy method in which the data processing operations are performed after the receipt of the resource allocation information, it is possible to increase the data transmission speed. The data transmission speed may be improved even when the layer-specific pre-processing operations are only partially performed. The resource allocation information may be acquired at step 1m-75 before at least one of the layer-specific pre-processing operations is completed. That is, the resource information may be received during at least one of the pre-processing operations of the PDCP entity, RLC entity, and MAC entity.

At step 1m-80, the transmitting device transmits the MAC PDU conveying the data. The transmitting device may send the MAC PDU to the PHY entity, and the PHY entity may transmit data using the MAC PDU.

Each of the layer-specific entities may be configured with a predetermined condition to perform, when the predetermined condition is fulfilled, an operation such as segmentation and MAC CE insertion in the embodiment of FIG. 14 in a similar manner as described above.

According to embodiment 4 of the present disclosure, it is possible to minimize the segmentation operations per logical channel.

If the UE transmits a transmission resource allocation request and receives an uplink grant, it may assign the transmission resources per logical channels using a predetermined method. Examples of such predetermined methods include logical channel prioritization (LCP). After assigning the transmission resources per logical channel, the UE may map the pre-processed MAC SDUs and corresponding MAC sub-headers to the per-logical channel transmission resources with the exception of the transmission resource of one logical channel according to a predetermined condition. That is, even though the amount of the number of pre-processed MAC SDUs and corresponding MAC sub-headers is greater than the assigned transmission resources, it may be possible to insert the last pre-processed MAC SDU and corresponding MAC sub-header without performing segmentation thereon. The UE may map the pre-processed data to the resources assigned for the respective logical channels with the exception of one logical channel and compare the whole amount of the mapped data with the size of the whole size of the allocated resources.

If the whole amount of the mapped data is greater than the whole size of the allocated resources, the UE may perform segmentation on the last pre-processed MAC SDU and corresponding MAC sub-header for filling the remaining space. If the whole amount of the mapped data is equal to or less than the whole size of the allocated resources, the UE may map the pre-processed data to the resources assigned for the logical channel selected according to the predetermined condition and, if the amount of the pre-processed data exceeds the amount of the remaining resources, perform segmentation for filling the remaining space. The predetermined condition may be based on priority. It may be possible to select on logical channel according to a predetermined method.

In embodiment 4 of the present disclosure, an alternative method may be performed in such a way of selecting a logical channel according to a predetermined condition to map the pre-processed data to the transmission resources assigned for the remaining logical channels without segmentation. The pre-processed data segmentation may be performed, if necessary, to map the segmented data to the transmission resources of the selected logical channel. The segmentation may be performed when the size of the remaining resources is greater than the size of the pre-processed data unit. The predetermined condition may be based on priority or QoS. That is, the UE may select a logical channel based on a priority or QoS value.

A description is made of the method according to embodiment 5 of the present disclosure below.

Even though the PDCP layer does not send IP packets or PDCP PDUs to the lower layer, the data pre-processing may be performed as follows.

An RLC entity may generate RLC headers corresponding to the PDCP PDUs in advance, and a MAC entity may generate MAC sub-headers corresponding to the PDCP PDUs (or RLC PDUs under the assumption of addition of RLC headers to the corresponding PDCP PDUs) in advance.

In this state, if an uplink transmission resource (UL grant) is received (e.g., receipt of transmission resource or prediction of transmission resource size after transmitting a buffer status report (BSR)), the lower layer entity may send a request to the PDCP entity for PDCP PDUs.

The PDCP entity may send IP packets or PDCP PDUs to the RLC entity, the RLC entity may add the pre-generated RLC headers to the PDCP PDUs to generate RLC PDUs and send them to the MAC entity, and the MAC entity may add the pre-generated MAC sub-headers to the RLC PDUs to configure a MAC PDU. If there is a need to perform segmentation because the uplink transmission resources are not sufficient, it may be possible to perform segmentation on the RLC PDUs along with an update of the RLC headers and the MAC sub-headers to configure a MAC PDU.

That is, the lower layer entities, i.e., RLC and MAC entities, may perform pre-processing operations to generate RLC headers and MAC sub-headers in advance before receiving any PDCP PDU from the PDCP entity.

Figure 15:
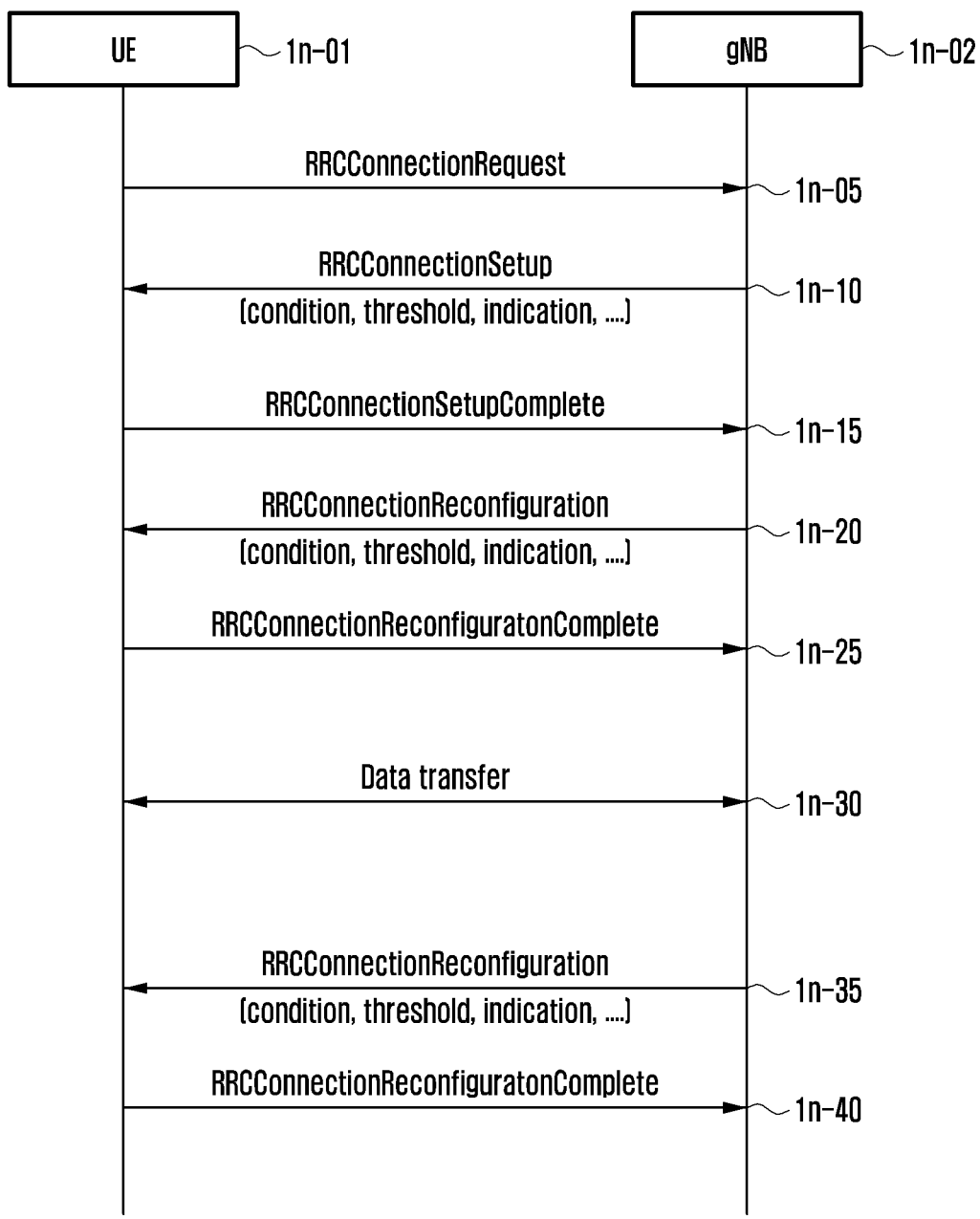
FIG. 15 is a signal diagram illustrating signal flows between a UE and a gNB in a procedure of establishing a connection with a network for data communication and protocol layer-specific entities according to an embodiment of the present disclosure.

FIG. 15 is a signal flow diagram illustrating signal flows between a UE and a gNB in a procedure of establishing a connection with a network for data communication and protocol layer-specific entities according to an embodiment of the present disclosure.

If a UE 1n-01 in an idle mode detects generation of data to be transmitted, it initiates an RRC connection establishment procedure with an LTE eNB or NR gNB 1n-02. The UE 1n-02 may acquire or establish an uplink transmission synchronization with the gNB through a random-access procedure.

At step 1n-05, the UE transmits a connection request message to the gNB 1n-02. The connection request message may be the RRCConnectionRequest message, as in FIG. 15. The connection request message may include an identifier of the UE in-01 and the connection establishment cause.

At step 1n-10, the gNB 1n-02 transmits a connection setup message to the UE 1n-01. The connection setup message may be the RRCConnectionSetup message. The connection setup message may include RRC connection configuration information and layer configuration information. That is, the connection setup message may include configuration information for establishing PHY or NR PHY, MAC or NR MAC, RLC or NR RLC, and PDCP or NR PDCP entities and for configuring part of the functions of the layer-specific entities (layer-specific functions described with reference to FIGS. 2 and 4). The connection setup message may also include configuration information for configuring predetermined conditions for use by the PDCP, RLC, and/or MAC entities in association with data pre-processing of the UE. For example, the predetermined condition may be a predetermined threshold value or a bitmap (e.g., table mapping conditions to bits and being shared between gNB and UE) or an indicator. The connection setup message may also include information indicative of performing a data pre-processing operation.

At step 1n-15, after completing RRC connection setup, the UE 1n-01 transmits a connection setup complete message to the gNB 1n-02. The setup complete message may be the RRCConnectionSetupComplete message. An RRC connection may be referred to as a signaling radio bearer (SRB), which is used for communicating RRC messages as control messages between the UE 1n-01 and gNB 1n-02.

At step 1n-20, the gNB 1n-02 transmits to the UE 1n-01 a connection reconfiguration message for establishing a data radio bearer (DRB). The connection reconfiguration message may be the RRCConnectionReconfiguration message. The connection reconfiguration message may include configuration information for configuring respective protocol layers. That is, the connection reconfiguration message may include configuration information for establishing PHY or NR PHY, MAC or NR MAC, RLC or NR RLC, and/or PDCP or NR PDCP entities, and for configuring part of the functions of the layer-specific entities (layer-specific functions described with reference to FIGS. 2 and 4). The connection reconfiguration message may also include configuration information for configuring predetermined conditions for use by the PDCP, RLC, and/or MAC entities in association with data pre-processing of the UE. For example, the predetermined condition may be a predetermined threshold value or a bitmap (e.g., table mapping conditions to bits and being shared between gNB and UE) or an indicator. The connection reconfiguration message may also include information indicative of performing a data pre-processing operation. The connection reconfiguration message may also include configuration information for establishing a DRB carrying user data.

At step 1n-25, after the UE 1n-01 configures a DRB based on the above information and functions of the respective protocol layers, the UE transmit a connection reconfiguration complete message to the gNB 1n-02. The connection reconfiguration complete message may be the RRCConnectionReconfigurationComplete message.

At step 1n-30, if the operations of the above steps have been completed, the UE 1n-01 may communicate data with the gNB 1n-02.

At step 1n-35, if necessary, the gNB 1n-02 transmits a connection reconfiguration message, such as the RRCConnectionReconfiguration message, to the UE 1n-01 to reconfigure the respective protocol layers of the UE 1n-01 during the communication between the gNB 1n-02 and the UE 1n-01. The RRCConnectionReconfiguration message may include the configuration information for establishing PHY or NR PHY, MAC or NR MAC, RLC or NR RLC, and PDCP or NR PDCP entities and for configuring part of the functions of the layer-specific entities (layer-specific functions described with reference to FIGS. 2 and 15). The RRCConnectionReconfiguration message may also include configuration information for configuring predetermined conditions for use by the PDCP, RLC, and/or MAC entities in association with data pre-processing of the UE. For example, the predetermined condition may be a predetermined threshold value or a bitmap (e.g., table mapping conditions to bits and being shared between gNB and UE) or an indicator. The connection reconfiguration message may also include information indicative of performing a data pre-processing operation. After completing establishment of the layer-specific entities, the UE 1n-01 transmits a connection reconfiguration complete message, such as the RRCConnectionReconfigurationComplete message, to the gNB 1n-02 at step 1n-40.

Figure 16:
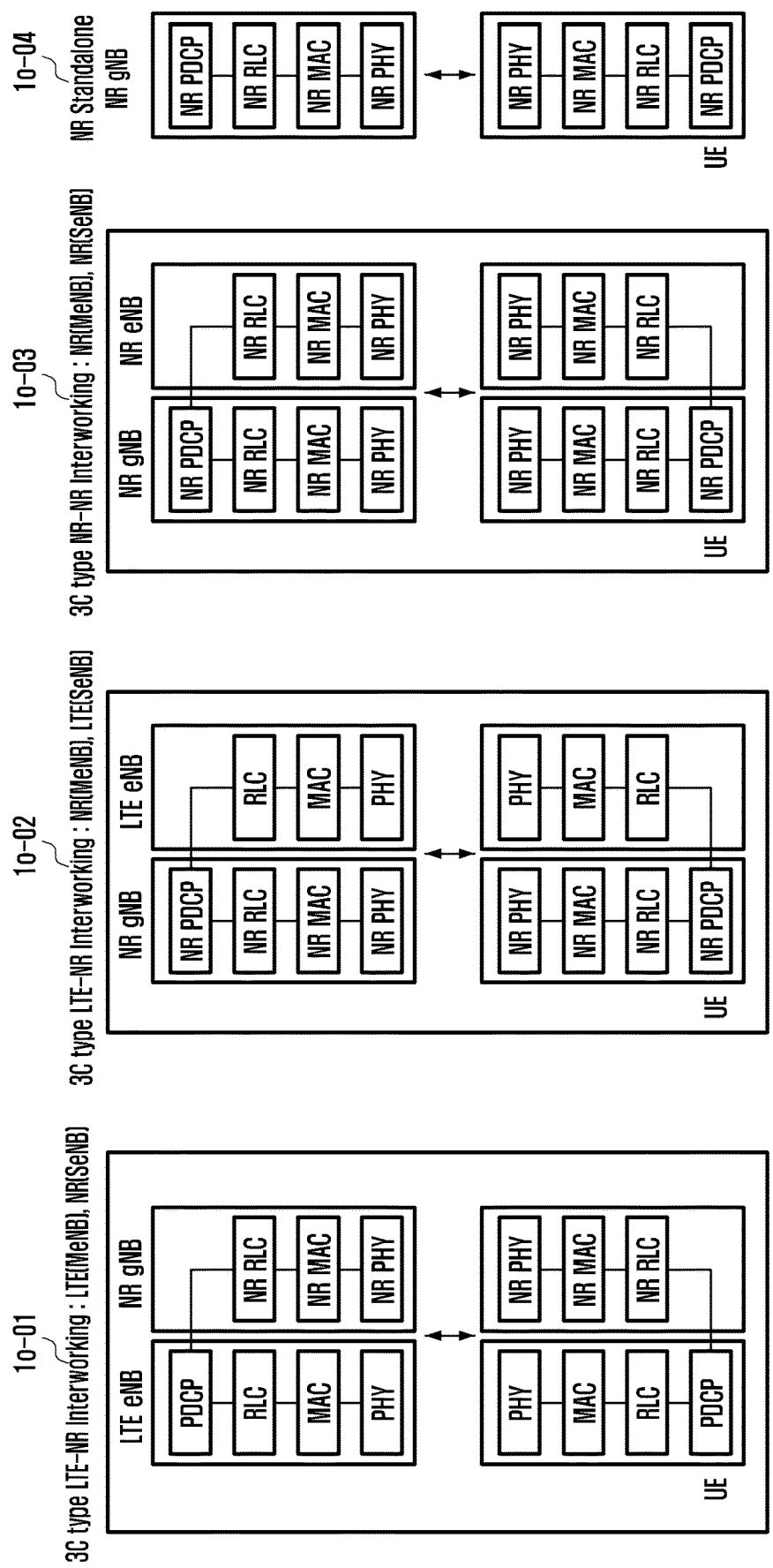
FIG. 16 is a diagram illustrating scenarios to which embodiments of the present disclosure are applicable.

FIG. 16 is a diagram illustrating scenarios to which embodiments of the present disclosure are applicable.

In FIG. 16, scenario 1o-01 is of a 3C type interworking between an LTE eNB as the macro cell group (MCG) eNB (MeNB) and an NR gNB as the secondary cell group (SCG) eNB (SeNB), scenario 1o-02 is of a 3C type interworking between an NR gNB as the MeNB and an LTE eNB as the SeNB, scenario 1o-03 is of a 3C type (MCG-split bearer) interworking between an NR gNB as the MeNB and an NR eNB as the SeNB, and scenario 1o-04 is of an NR standalone network in which an NR gNB serves the UE. One or any combination of the data pre-processing methods according to embodiments 1-1, 1-2, 2, 3-1, 3-2, 4, and 5 may be applied to the data processing procedure in the UE being served by the NR gNB or in the NR gNB itself in the scenarios 1o-01, 1o-02, 1o-03, and 1o-04.

The data pre-processing method according to any one of embodiments 1-1, 1-2, 2, 3-1, 3-2, 4, and 5 of the present disclosure may be applicable to any or all of the RLC transparent mode (TM), the RLC unacknowledged mode (UM), and/or the RLC acknowledgement mode (AM).

A description is made hereinafter of the data pre-processing method for protecting against downlink data processing throughput degradation according to embodiment 6 of the present disclosure. Embodiment 6 of the present disclosure may be combined with any of embodiments 1 to 5. That is, in embodiment 6 of the present disclosure, one of the data pre-processing procedures according to embodiments 1 to 5 may be applied to processing feedback information (e.g., acknowledgement (ACK) and negative acknowledgement (NACK)) in accordance with embodiment 6.

Figure 17:
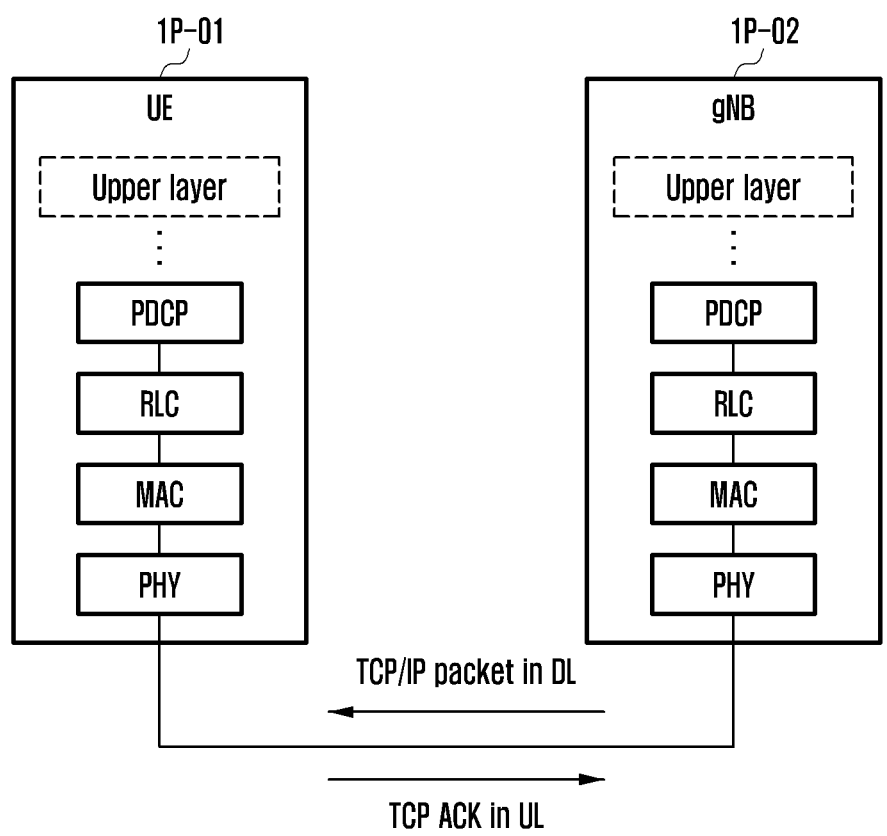
FIG. 17 is a diagram illustrating protocol stacks which interface between a UE and a gNB in the user plane in a next generation mobile communication system according to an embodiment of the present disclosure.

FIG. 17 is a diagram illustrating a protocol stack of an interface between a UE and a gNB for a data plane (or a user plane) in a next generation mobile communication system according to an embodiment of the present disclosure.

In FIG. 17, the PHY, MAC, RLC, and PDCP layers are configured and operate as described with reference to FIG. 4, and the upper layer may include at least one of an IP layer and an application layer.

In downlink transmission, a gNB 1P-02 transmits a downlink packet to a UE 1P-01. The packet may be a transmission control protocol/internet protocol (TCP/IP) packet. The UE 1P-01 may transmit back to the gNB 1P-02 feedback information corresponding to the downlink packet received from gNB 1P-02. The feedback information may be acknowledgement/negative-acknowledgement (ACK/NACK) corresponding to the downlink packet. The feedback information may be a TCP ACK. Depending on whether the downlink packet transmitted by the gNB 1p-02 is successfully received or decoded, the upper layer of the UE 1P-01 may generate the feedback information. The feedback information may be sent to the PHY layer via the PDCP, RLC, and MAC layer and then transmitted to the gNB 1P-02.

The gNB 1P-02 may transmit downlink data using a transmission window (hereinafter, interchangeably referred to as "transmission window" or "window"). The gNB 1P-02 may transmit a number of the packets corresponding to the window size without receipt of feedback information and, in order to move the window for transmitting the next packet, the gNB 1P-02 has to receive the ACK corresponding to the previously transmitted data before transmitting subsequent downlink data packets. That is, if the downlink packet is received from the gNB 1P-02, the UE 1P-01 transmits feedback information (TCP ACK) to the gNB 1p-02 in the uplink, and, upon receipt of the TCP ACK, the gNB 1P-02 may resume downlink transmission by moving the window.

One goal of the NR physical layer (PHY) is to support a downlink data rate of up to 20 Gbps. Accordingly, considering the high data rate of the NR in the downlink, the gNB will transmit a large number of downlink packets in a much shorter time, and this means that the UE has to transmit a large number of TCP ACKs in a much shorter time, which is very likely to cause a bottleneck in uplink transmission. This bottleneck may give rise to TCP ACK loss and/or transmission delay and, in turn, the gNB may neither move the window nor increase the window size, but, in some cases, may even decrease the window size. This may cause actual downlink data throughput of the gNB to fail to meet the downlink data rate goal of the NR.

In NR, although the gNB may be configured with a high frequency band (e.g., mmWave), a larger number of antennas, and a beamforming scheme to meet the high downlink data rate requirement, the uplink transmission of the UE will still be restricted by the uplink frequency band and the number of available antennas for the UE. If the uplink transmission limitations of the UE causes a bottleneck or the TCP ACKs corresponding to the downlink data transmission of the gNB, the gNB cannot transmit downlink data at its highest possible rate even though it has a good radio environment for downlink data transmission, resulting in downlink data processing throughput degradation. In Equation (1) below, the UL Data Rate denotes the uplink data rate for TCP ACK transmission of the UE:

$$UL \text{ Data Rate} = \frac{DL \text{ Data Rate} * TCP \text{ ACK size}}{Frequency * IP \text{ packet size}} \quad (1)$$

In Equation (1), the DL Data Rate denotes the downlink data rate for downlink data transmission of the gNB; the IP packet size denotes the size of the downlink packets being transmitted by the gNB; the TCP ACK size denotes the size of a TCP ACK; and the Frequency (or "TCP ACK frequency") denotes a ratio of TCP ACKs to n packets. For example, the Frequency is set to 1 when one TCP ACK is transmitted per packet and 2 when one TCP ACK is transmitted per two packets. For example, the Frequency is set to 1 in a UMTS system where one TCP ACK is transmitted per one IP packet and 2 in an LTE system wherein one TCP ACK is transmitted per two IP packets.

DL data rate/IP packet size may be understood as the number of downlink IP packets, the number of IP packets/frequency may be understood as the number of TCP ACKs to be transmitted by the UE, and the number of TCP ACKs*TCP ACK size may be understood as UL data rate. In Equation (1), it is assumed that the UL data rate is the uplink rate for transmitting TCP ACKs with the exception of uplink data.

Typically, the size of an IP packet is 1500 bytes, and the size of a TCP ACK is 72 bytes (IP6 header (40 bytes)+TCP header (32 bytes)). In Table 1, UL data rates required for supporting the corresponding DL peak data rates under the assumption of the preceding IP packet and TCP ACK sizes and a TCP ACK frequency of 2 in Equation (1) are shown.

TABLE 1

| DL peak data rate | Required UL data rate |
| --- | --- |
| 5 Gbps | 120 Mbps |
| 20 Gbps | 480 Mbps |

In reference to Table 1, the required TCP ACK data rate is 120 Mbps for supporting the DL data rate of 5 Gbps and 480 Mbps for supporting the DL data rate of 20 Gbps. The data rate of 120 Mbps is proximate to the required UL peak data rate of the UE in LTE, but the data rate of 480 Mbps cannot be supported in LTE uplink. Since the UE has to transmit data as well as TCP ACKs in uplink, if the feedback method designed for UMTS or LTE is used in NR without modification, it will be difficult to avoid the TCP ACK bottleneck problem.

Figure 18:
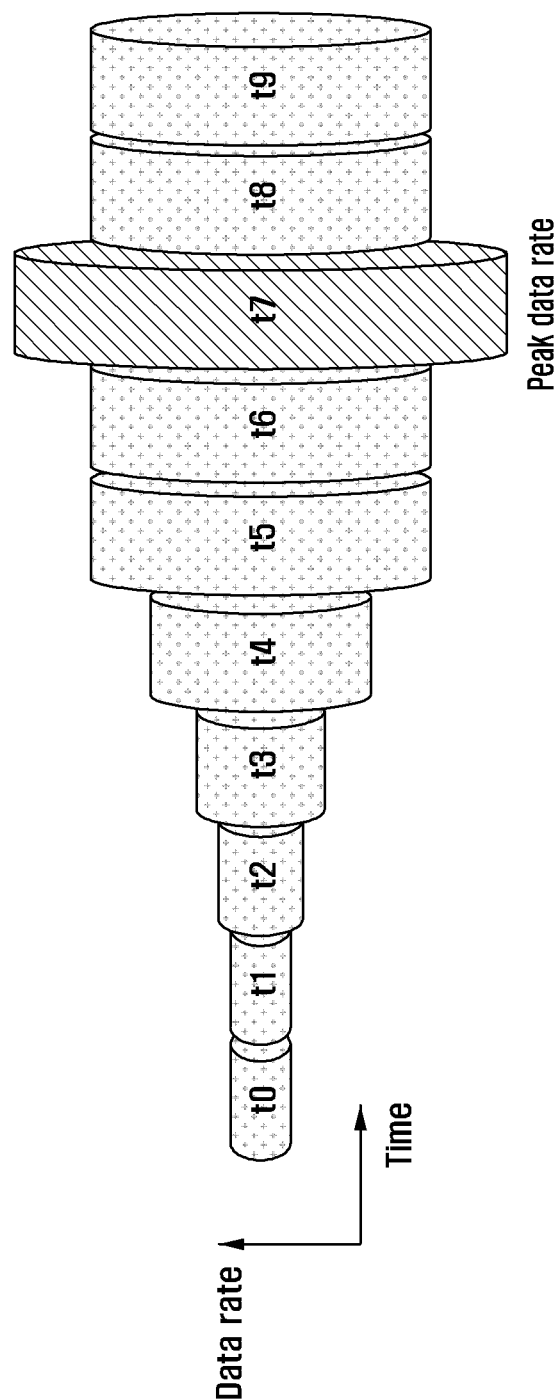
FIG. 18 is a diagram illustrating a relationship between flow control and data rate of a gNB according to an embodiment of the present disclosure.

FIG. 18 is a diagram for explaining a relationship between flow control and data rate of a gNB according to an embodiment of the present disclosure.

In FIG. 18, the horizontal axis denotes time, and the vertical axis denotes the data rate or window size. The downlink data rate may increase or decrease according to the flow control of the gNB. The gNB may adjust the window size through the flow control. That is, the gNB may perform flow control to adjust the window size, thereby adjusting the downlink data rate. If the window size is large, this means that the gNB is allowed to transmit a large amount of data; if the window size is small, this means that the eNB is allowed to transmit a small amount of data. Typically, the window size is small because there is a small amount of data to transmit, but if the window size is small and there is a large amount of data to transmit, the downlink data processing efficiency may be degraded.

The gNB may adjust the window size based on the TCP ACK received from the UE. The gNB may adjust the window size depending on how quickly/many TCP ACKs are received. If the TCP ACKs are received quickly or if a large amount of TCP ACKs are received, the gNB may increase the window size; if the TCP ACKs are received slowly or if a small amount of TCP ACKs are received, the gNB may decrease the window size. Since some of the TCP ACKs are likely to be lost over a wired/wireless channel, the number of TCP ACKs may be a more important factor.

In FIG. 18, the window size is small at time t0 and time t1, but it increases as time passes and reaches the maximum window size at time t7. This may be interpreted as meaning that the number of TCP ACKs received from the UE has increased till time t7 and thus the gNB has increased the window size. After time t7, the window size decreases, and this may be interpreted as meaning that the gNB has decreased the window size because the number of received TCP ACKs has decreased since time t7.

As the gNB adjusts the window size based on the number of received TCP ACKs and the downlink data rate is affected by the window size, there is a need of an improved TCP ACK transmission method for a UE to support a high DL data rate.

Suppose a situation where the UE is configured with a low TCP ACK frequency and transmits a large number of TCP ACKs. For example, it is assumed that the gNB transmits 100 IP packets (e.g., packet #1 to packet #100) and the TCP ACK frequency is 1. If the gNB receives 100 TCP ACKs corresponding to the 100 IP packets, the gNB may determine that the radio environment is good and thus increase the window size, resulting in an increase of DL data processing throughput.

If the gNB receives 50 TCP ACKs after transmitting 100 IP packets, it determines that the radio environment is bad and thus decreases the window size, resulting in a reduction of DL data processing throughput. If the UE transmits too many TCP ACKs in too short a time in the uplink, this is likely to cause a bottleneck and thus the gNB cannot properly receive all of the transmitted TCP ACKs, resulting in window size reduction and DL data processing throughput degradation.

It may also be possible to adjust the number of TCP ACKs to be transmitted by the UE by increasing the TCP ACK frequency.

Figure 19:
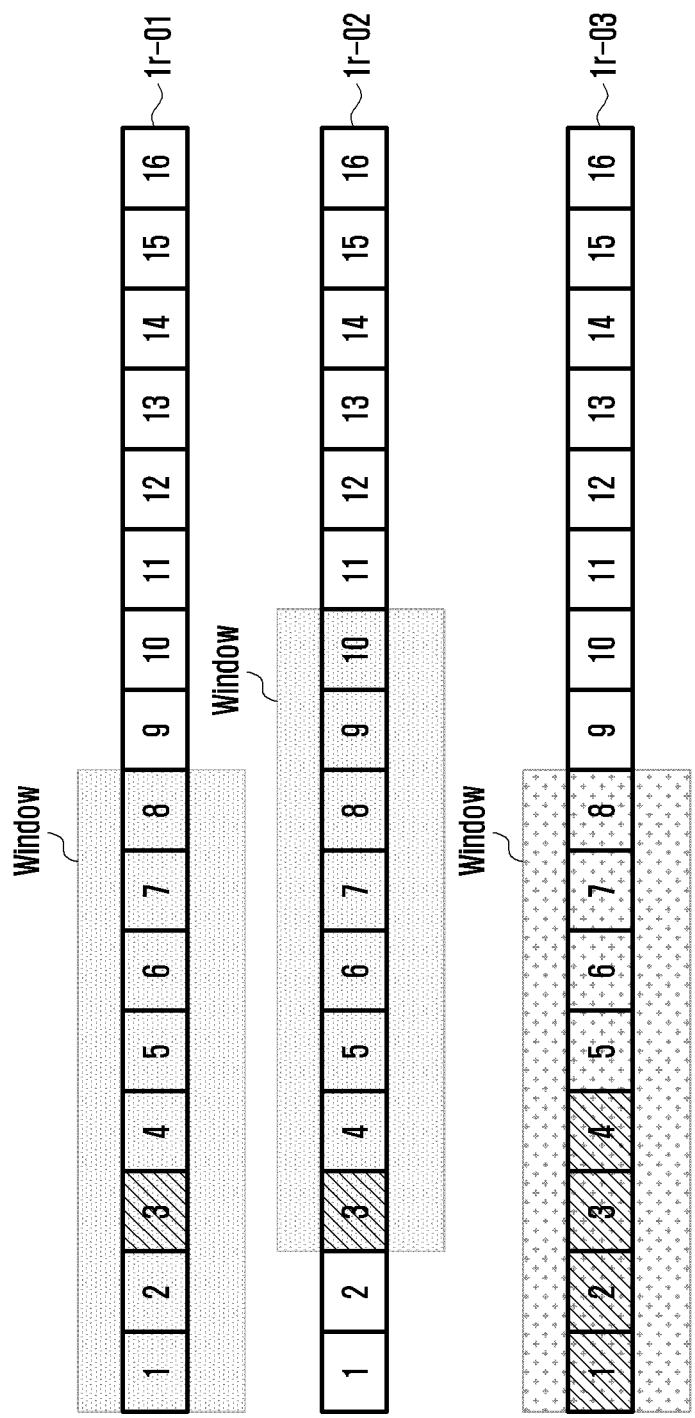
FIG. 19 is a diagram illustrating a relationship between feedback reception and the reception window according to an embodiment of the present disclosure.

FIG. 19 is a diagram illustrating a relationship between feedback reception and the reception window according to an embodiment of the present disclosure. In FIG. 19, it is assumed that the window size is 8 and IP packet streams 1r-01, 1r-02, and 1r-03 are transmitted from a gNB. The IP packet streams 1r-01 and 1r-02 have a TCP ACK frequency of 1, and the IP packet stream 1r-03 has a TCP ACK frequency of 4.

In the IP packet stream 1r-01, the gNB may transmit IP packets #1 to #8 that fall within the window. If a TCP ACK corresponding to an IP packet transmitted by the gNB is received, the window may move forward. If no TCP ACK is received, the window stalls, i.e., remains in the same position. In the IP stream 1r-02, it is assumed that the gNB has already received the TCP ACKs corresponding to the IP packets #1 and #2, so the window moves forward by two packets such that the IP packets #9 and #10 now fall within the window. In the IP packet stream 1r-02, it is assumed that the TCP ACK corresponding to the IP packet #3 has not yet been received. If the TCP ACK corresponding to the IP packet #4 is received before the TCP ACK corresponding to IP packet #3, the gNB detects the loss of, or failure to receive, the TCP ACK corresponding to the IP packet #3. Since the TCP ACK corresponding to the IP packet #3 has not been received, the window stalls even though the TCP ACK corresponding to the IP packet #4 is received; thus, the gNB cannot transmit IP packet #11. If the TCP ACK corresponding to the IP packet #3 is received, the window moves forward such that the gNB transmits IP packet #11 and its subsequent packets.

In the IP packet stream 1r-03, it is assumed that the TCP ACK frequency is 4; thus, one TCP ACK is transmitted per 4 IP packets. In the IP packet stream 1r-03, it is assumed that the TCP ACKs corresponding to the IP packets #1, #2, #3, and #4 are not received. Since just one TCP ACK corresponds to 4 IP packets, although the TCP ACK corresponding to the IP packets #1, #2, #3, and #4 is not received, it is impossible to become aware of the loss of the TCP ACK corresponding to the IP packets #1, #2, #3, and #4 before receiving the TCP ACK corresponding to the IP packets #5, #6, #7, and #8. Since the window does not move until the receipt of the TCP ACK corresponding to the IP packets #1, #2, #3, and #4, the gNB cannot transmit IP packet #9 and its subsequent IP packets. That is, if the number of TCP ACKs that is supposed to be transmitted is too small in comparison with the downlink data rate, i.e., if the TCP ACK generation interval of the UE or the TCP ACK reception interval of the gNB is long, this is likely to increase downlink data transmission delay because the window stalls for a longer period whenever a TCP ACK is lost.

If too large a number of TCP ACKs are transmitted in comparison with the number of transmitted IP packets, this is advantageous in that it is possible to detect TCP ACK loss quickly and move the window smoothly (i.e., low probability of window stalling), but it is disadvantageous in terms of high bottleneck probability because of the high TCP ACK frequency. If too small a number of TCP ACKs are transmitted in comparison with the number of transmitted IP packets, this is disadvantageous in that it is impossible to detect the loss of a TCP ACK quickly and move the window smoothly (i.e., high probability of window stalling), but it is advantageous in terms of low bottleneck probability because of the low TCP ACK frequency. The gNB may support various downlink data rates and change the downlink data rate and, if a low TCP ACK frequency is applied (i.e., if one TCP ACK is generated per many IP packets), it may be possible to protect against bottlenecks in a high data rate system such as NR but to cause significant transmission delay in a relatively low data rate system such as UMTS and LTE.

Accordingly, it is not always preferable to increase or decrease the number of TCP ACKs per a predetermined number of IP packets, i.e., statically, but instead it may be preferable to make the TCP ACK frequency dynamic.

A description is made hereinafter of a method for configuring the TCP ACK frequency dynamically according to an embodiment of the present disclosure.

The UE may configure the TCP ACK frequency dynamically in consideration of the downlink and uplink data rates. By configuring the TCP ACK frequency dynamically in such a way to avoid significant bottlenecks and the frequency of window stalling caused by a low TCP ACK frequency or loss of TCP ACK, it may possible to increase the downlink data processing throughput.

The TCP ACK frequency determination method according to an embodiment of the present disclosure may be expressed by Equation (2) below.

$$\text{Frequency} = \frac{DL \text{ Data Rate} * TCP \text{ ACK size}}{UL \text{ Data Rate} * IP \text{ packet size}} \quad (2)$$

The parameters in Equation (2) are identical with those in Equation (1), except that the UL Data Rate of Equation (2) may differ from the UL Data Rate of Equation (1). Unlike the UL Data Rate in Equation (1) that denotes the UL data rate required for TCP ACK transmission, the UL Data Rate of Equation (2) denotes the UL data rate determined in consideration of TCP ACK and uplink data transmission—i.e., the UL data rate in Equation (2) is dynamic and changes over time.

The UE may determine/assign the TCP ACK frequency dynamically in consideration of the DL data rate and UL data rate. The DL and UL data rates may be the values calculated for the purpose of logging when in diagnostic mode (DM). For example, the DL and UL data rates may be calculated based on the size of the TB in the PHY layer of the UE. The DL and UL data rates may also be calculated based on the size of the packet in the PDCP layer of the UE. The DL and UL data rates of Equation (2) may be measured/calculated based on the size of the TB or IP packet. The UL and DL data rates may be calculated at a predetermined interval. For example, the UL and DL data rates may be calculated every second.

The UE may determine an appropriate TCP ACK frequency between the UE and the gNB using Equation (2) with measured/calculated UL and DL data. The UE may calculate the TCP ACK frequency periodically or aperiodically. In the case of calculating the TCP ACK frequency periodically, the TCP ACK frequency calculation may be performed at a predetermined interval. In the case of calculating the TCP ACK frequency aperiodically, the UE may calculate the TCP ACK frequency when a predetermined condition is fulfilled. For example, it may be possible to compare the UL and DL data rates to predetermined thresholds to trigger aperiodic TCP ACK frequency calculation. It may also be possible to adjust the TCP ACK frequency upon receipt of a TCP ACK frequency adjustment request from the gNB.

Equation (3) is an alternative TCP ACK frequency determination method of the UE according to another embodiment of the present disclosure, and is derived from Equation (2).

$$\text{Frequency} = \frac{DL \text{ Data Rate} * TCP \text{ ACK size}}{x * UL \text{ Data Rate} * IP \text{ packet size}}, \, o \leq x \leq 1 \quad (3)$$

The parameters in Equation (3) are identical with those in Equation (2) except for a new parameter x. As described above, the UL data rate in Equation (2) denotes a dynamic uplink data rate determined in consideration of TCP ACK and data. In order to determine a more reasonable TCP ACK frequency, it is important to check the data rate allocated (or to be allocated) or allowed (or to be allowed) for a TCP ACK. In Equation (3), the TCP ACK frequency is determined under the assumption of the data rate to be allowed or allocated for TCP ACK in the total UL data rate by applying weight x. Although the weight x multiplied by the UL data rate in Equation (3) is limited to $0 \leq x \leq 1$, the range of the weight x is not limited thereto in other embodiments of the present disclosure. The data rate for TCP ACK in the UL data rate may be determined by applying x in various manners. For example, it may be possible to subtract the data rate for data with exception of the TCP ACK from the UL data rate to determine the data rate for TCP ACK.

With the exception of the application of parameter x, Equation (3) is identical to Equation (2).

The UE may also determine whether to use a predetermined TCP ACK frequency or a TCP ACK frequency calculated dynamically based on the data rate. For example, the UE may determine the TCP ACK frequency according to the DL data rate.

For example, the UE may be configured to use the predetermined TCP ACK frequency when the DL data rate is less than or equal to A bps and the dynamic TCP ACK frequency determined by Equation (2) or (3) when the DL data rate is greater than A bps. For example, the A bps may be the peak DL data rate supported in LTE. It may be possible to use a value corresponding to the TCP ACK frequency of LTE to the extent of not exceeding the peak DL data rate of LTE. The TCP ACK frequency for LTE may be 2. If the DL data rate is greater than the peak DL data rate of LTE, it is possible to use the TCP ACK frequency calculated dynamically. In this way, the UE may use the LTE TCP ACK frequency for the case where the DL data rate is less than or equal to the peak DL data rate for LTE and the TCP ACK frequency calculated dynamically for the case where the DL data rate is greater than the peak DL data rate for LTE as in NR.

In embodiments using the TCP ACK frequency of LTE or other legacy systems, the data rate A is not limited to the peak DL data rate of LTE, and it may be set to a value determined depending on the implementation of a UE. Such embodiments may be extended in such a way of using a predetermined TCP ACK frequency before a predetermined threshold condition is fulfilled without restricting the DL data rate and the dynamic TCP ACK frequency after the predetermined threshold condition is fulfilled.

According to an embodiment of the present disclosure, the UE may use a TCP ACK frequency determined based on the data rate. The data rate may be the DL data rate. The UE may use predetermined values as shown in Table 2.

TABLE 2

| | DL data rate | | | | |
|---|---|---|---|---|---|
| | 0-A bps | A-B bps | B-C bps | C-D bps | ... | N-20 Gbps |
| Frequency | 2 | 3 | 4 | 5 | ... | 10 |

Although specific DL data rate ranges and frequencies are listed in Table 2, the frequency values and DL data rate ranges are not limited thereto. The UE may store the information on the TCP ACK frequency and DL data rate ranges in the form of the above table. The UE may calculate a DL data rate and compare the calculated DL data rate with the DL data rate ranges in the table to determine the TCP ACK frequency to use.

Figure 20:
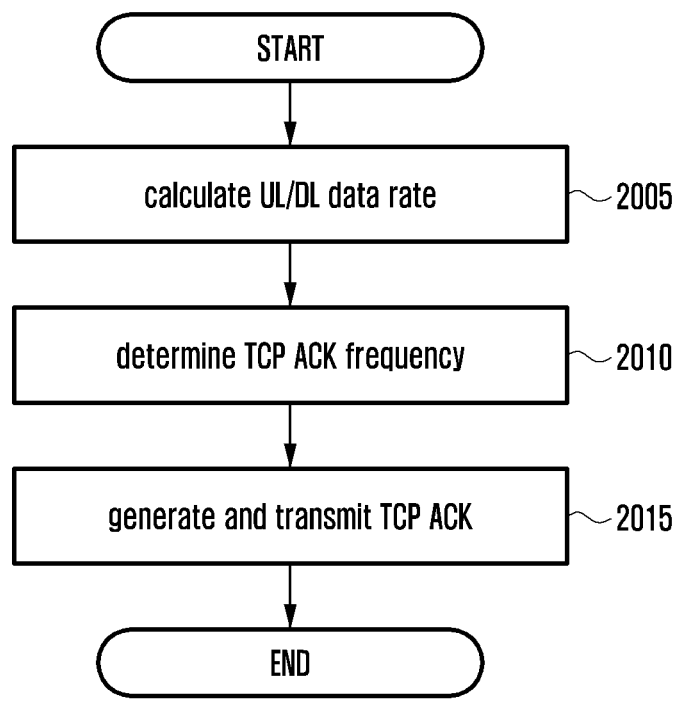
FIG. 20 is a flowchart illustrating an operation of a UE according to an embodiment of the preset disclosure.

FIG. 20 is a flowchart illustrating an operation of a UE according to an embodiment of the preset disclosure.

In FIG. 20, the UE measures/calculates a DL data rate and/or a UL data rate at step 2005.

At step 2010, the UE determines the TCP ACK frequency. The UE may determine the TCP ACK frequency dynamically based on at least one of the DL and UL data rates. The UE may determine the TCP ACK frequency by at least one of (1) use of Equation (2), (2) use of Equation (3), (3) applying a predetermined TCP ACK frequency or a dynamic TCP ACK, and (4) selecting one of the TCP ACK frequencies mapped to predetermined DL data rate ranges. The methods (1), (2), (3), and (4) have been described above. Step 2010 may be performed periodically or aperiodically. In the case of determining the TCP ACK frequency aperiodically, the UE may determine whether to perform the operation of step 2010 based on a threshold. For example, the UE may compare the UL data rate or DL data rate with a predetermined threshold to determine whether to perform step 2010. The UE may perform step 2010 when a TCP ACK frequency adjustment request is received from the gNB. The configuration for use in determining whether to perform the operation of step 2010 may also be used in determining whether to perform the operation of step 2005.

At step 2015, the UE generates and transmits a TCP ACK. The UE transmits the generated TCP ACK to the gNB. The TCP ACK may be generated in an upper layer of the UE. The TCP ACK generated in the upper layer may be sent to the PHY layer via the PDCP, RLC, and MAC layers, thereafter being transmitted to the gNB. The pre-processing method of any one of embodiments 1-1, 1-2, 2, 3-1, 3-2, 4, and 5 may be applied to the operation of step 2015. If a TCP ACK is received from the upper layer, at least one of the protocol layers below the upper layer may pre-process the TCP ACK. If a UL grant is received after pre-processing the TCP ACK, the UE may transmit the TCP ACK to the gNB based on the UL grant.

The data pre-processing method for processing TCP ACKs according to embodiment 6 of the present disclosure is more efficient in combination with at least one of embodiments 1-1, 1-2, 2, 3-1, 3-2, 4, and 5. In embodiment 6 of the present disclosure, it is possible to adjust the number of TCP ACKs to be generated in the upper layer by determining the TCP ACK frequency dynamically. The data pre-processing method according to this embodiment of the present disclosure is advantageous in terms of low TCP ACK drop probability at the protocol layers below the upper layer because the TCP ACK frequency is determined based on the UL and DL data rates in consideration of the radio environment. Although it may be possible transmit part of the TCP ACKs generated at the PDCP layer and lower layers thereof by dropping the remaining TCP ACKs in consideration of the radio environment, the data pre-processing method according to this embodiment of the present disclosure is characterized by generating an appropriate number of TCP ACKs in the upper layer rather than dropping part of the TCP ACKs generated in the lower layers according to the radio environment.

When pre-processing the TCP ACKs generated in the PDCP layer and layers below thereof and dropping part of the TCP ACKs in consideration of the radio environment, it is difficult to identify and drop the PDCP PDUs carrying TCP ACKs because a MAC entity cannot determine whether a PDCP PDU received from the upper layer carries data or a TCP ACK. Accordingly, in the system of performing data pre-processing according to the present disclosure, it is preferred to control the number of TCP ACKs at the creation stage based on the TCP ACK frequency determined in consideration of the radio environment rather than to drop part of TCP ACKs based on a TCP ACK frequency generated previously in consideration of the radio environment at the pre-processing stage.

As described above, the data pre-processing method of the present disclosure is capable of overcoming the downlink data throughput degradation caused by TCP ACK bottlenecks by allowing the UE to determine the TCP ACK frequency dynamically according to the radio environment.

The data pre-processing procedure for single-connectivity or dual-connectivity environment according to an embodiment of the present disclosure may be applied as follows. The data pre-processing methods to be described hereinafter may be applicable to the above described embodiments of the present disclosure.

1. First Embodiment of Data Pre-Processing

Each PDCP entity may perform ciphering and, if necessary, integrity protection on PDCP SDU (IP packet or data packet), and generate a PDCP header; each RLC entity may assign RLC sequence numbers, set the segmentation information (SI) field, and generate an RLC header to complete the data pre-processing. If the MAC layer generates and sends to the RLC entity an instruction/request because a predetermined condition is fulfilled, the RLC entity may set the length (L) field to be fit for the size of an RLC PDU and RLC entity-specific logical channel identifier (LCID) in order for the MAC entity to process the data pre-processed by the RLC entity; the MAC entity may configure a MAC header, MAC sub-header, and MAC SDUs, multiplexing the MAC SDUs into a MAC PDU to be fit for the size of uplink transmission resource. The predetermined condition of the MAC layer may be the receipt of an uplink grant from the base station and, if the uplink grant is received, the MAC entity may instruct the RLC entities to send the pre-processed RLC PDUs.

2. Second Embodiment of Data Pre-Processing

The second embodiment of data pre-processing is identical with that of the first embodiment with the exception that the PDCP and RLC headers may be separately generated, stored, and managed. That is, the PDCP and RLC headers are generated, processed, and stored in the course of data pre-processing in the second embodiment. If it is necessary to perform segmentation due to the lack of allocated transmission resources after the receipt of uplink grant, it may be possible to update the SI field of the generated RLC header (e.g., 01 for the first segment, 10 for the last segment, and 11 for both the first and last segments) and, if necessary, add a segment offset (SO) field to the RLC header dynamically (if the segment is not the first segment, add the 2-byte SO field to indicate the offset).

3. Third Embodiment of Data Pre-Processing

The third embodiment of data pre-processing is identical with that of the first embodiment with the exception that even the MAC entity performs data pre-processing before receiving an uplink grant. Here, the PDCP and RLC headers may be separately generated, stored, and managed in the course of data pre-processing. If it is necessary to perform segmentation due to the lack of allocated transmission resources after the receipt of uplink grant, it may be possible to update the SI field of the generated RLC header (01 for the first segment, 10 for the last segment, and 11 for both the first and last segments) and, if necessary, add an SO field to the RLC header dynamically (if the segment is not the first segment, add the 2-byte SO field to indicate the offset).

Figure 21:
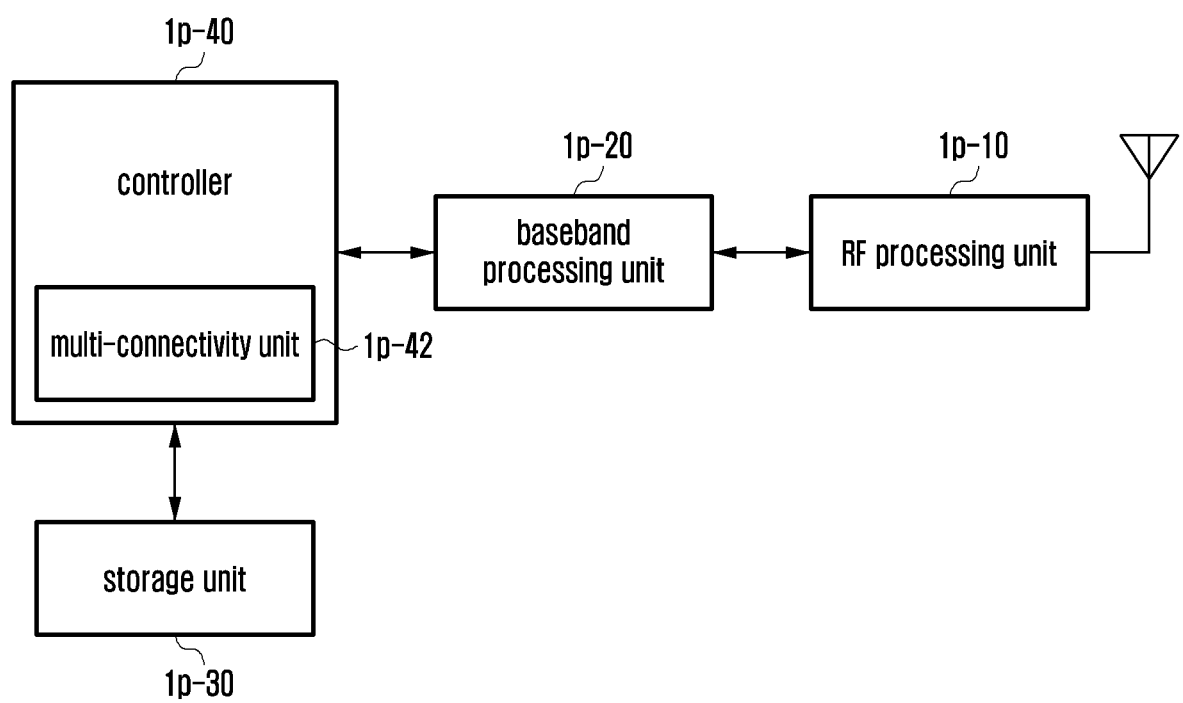
FIG. 21 is a block diagram illustrating a configuration of a UE according to an embodiment of the present disclosure.

FIG. 21 is a block diagram illustrating a configuration of a UE according to an embodiment of the present disclosure.

As shown in FIG. 21, the UE includes a radio frequency (RF) processing unit 1p-10, a baseband processing unit 1p-20, a storage unit 1p-30, and a controller 1p-40. In other embodiments, the UE may be simply configured to have a controller and a transceiver. The controller may include at least one processor.

The RF processing unit 1p-10 implements signal band conversion and amplification for transmitting signals over a radio channel. That is, the RF processing unit 1p-10 up-converts a baseband signal output from the baseband processing unit 1p-20 to an RF band signal for transmission through the antenna(s) and down-converts an RF band signal received through the antenna(s) to a baseband signal. The RF processing unit 1p-10 may include a transmission filter, a reception filter, an amplifier, a mixer, an oscillator, a digital-to-analog converter (DAC), and an analog-to-digital convertor (ADC). Although one antenna is depicted in the drawing, the terminal may include a plurality of antennas. The RF processing unit 1p-10 may include a plurality of RF chains. The RF processing unit 1p-10 may perform beamforming. For beamforming, the RF processing unit 1p-10 may adjust the phases and sizes of the signal transmitted/received through the antennas or antenna elements. The RF processing unit 1p-10 may perform a MIMO operation to receive multiple layers simultaneously. The RF processing unit 1p-10 may configure a plurality of antennas or antenna elements to perform reception beam sweeping and adjust a direction and width of the reception beam to be tuned to the transmission beam.

The baseband processing unit 1p-20 implements the conversion between baseband signals and bit strings according to a physical layer protocol of the system. For example, the baseband processing unit 1p-20 performs encoding and modulation on the transmit bit strings to generate complex symbols in data transmission mode. The baseband processing unit 1p-20 also performs demodulation and decoding on the baseband signal from the RF processing unit 1p-10 to recover the received bit strings in data reception mode. In an OFDM system, the baseband processing unit 1p-20 performs encoding and modulation on the transmit bit string to generate complex symbols, maps the complex symbols to subcarriers, performs inverse fast Fourier transform (IFFT) on the subcarriers, and inserts a cyclic prefix (CP) to generate OFDM symbols in the data transmit mode. The baseband processing unit 1p-20 splits the baseband signal from the RF processing unit 1p-10 into OFDM symbols, recovers the signals mapped to the subcarriers through fast Fourier transform (FFT), and performs demodulation and decoding to recover the bit strings in the data reception mode.

The baseband processing unit 1p-20 and the RF processing unit 1p-10 help implement the transmitting and receiving signals as described above. Accordingly, the baseband processing unit 1p-20 and/or the RF processing unit 1p-10 may be referred to as a transmission unit, a reception unit, a transceiver, or a communication unit. At least one of the baseband processing unit 1p-20 and the RF processing unit 1p-10 may include a plurality of communication modules for supporting different radio access technologies and/or for processing different frequency bands signals. Examples of the radio access technologies include LTE and NR networks. Examples of different frequency bands include the super high frequency (SHF) band (e.g., 2.5 GHz and 5 GHz) and the millimeter wave (mmWave) bands (e.g., 60 GHz).

The storage unit 1p-30 stores basic programs for operation of the UE, application programs, and data such as configuration information. The storage unit 1p-30 provides the stored data in response to a request from the controller 1p-40.

The controller 1p-40 controls operations of the terminal. For example, the controller 1p-40 may control the baseband processing unit 1p-20 and the RF processing unit 1p-10 to transmit/receive signals. The controller 1p-40 also writes and reads data to and from the storage unit 1p-30. In order to accomplish this, the controller 1p-40 may include at least one processor. For example, the controller 1p-40 may include a communication processor for controlling communication and an application processor for providing higher layer processing, e.g., application layer protocol processing.

According to an embodiment of the present disclosure, the controller 1p-40 may include at least one of a processor, a processing unit, a processing module for performing the operations of the NR PDCP, NR RLC, and NR MAC layers, and a multi-connectivity unit 1p-42. Although specific terms (e.g., PDCP entity, RLC entity, MAC entity, and PHY entity) are used to describe and illustrate the embodiments of the present disclosure for convenience of explanation, the configuration of the UE is not limited thereby. Each entity may be a layer-specific entity or an entity responsible for operations of two or more layers. Although the layer-specific operations are logically distinguished from each other, the controller 1p-40 may control the operations of the respective logical layers in an overlapping manner.

According to an embodiment of the present disclosure, the controller 1p-40 may control at least one protocol layer to acquire data and pre-process the acquired data before receiving resource allocation information for data transmission and, when the resource allocation information is received, generate a MAC PDU with the pre-processed data based on the resource allocation information.

The controller 1p-40 may also control at least one of a PDCP layer and lower layers below a PDCP layer in the transmitting device to pre-process, generate PDCP PDUs in the PDCP layer, and send the PDCP PDUs to the RLC layer of the transmitting device. The controller 1p-40 may also control the RLC layer to generate RLC PDUs in with the PDCP PDUs in the RLC layer, send the RLC PDUs to the MAC layer, and control the MAC layer to generate MAC SDUs and corresponding MAC sub-headers with the RLC PDUs.

The controller 1p-40 may also assign transmission resources per logical channel for data transmission based on the resource allocation information and generate a MAC PDU with the MAC SDUs and corresponding MAC sub-headers based on the resource allocation information. The controller 1p-40 may also control one more protocol layer/entities to perform segmentation, when the allocated transmission resources are insufficient. For example when the allocated transmission resources are insufficient to generate a MAC PDU containing all of the MAC SDUs, controller 1p-40 may control to segment the RLC PDU corresponding to a certain MAC SDU, generate new MAC SDUs with segmented RLC PDUs, and fill the remaining space of the MAC PDU with the new MAC SDUs.

The controller 1p-40 may also control to configure a threshold corresponding to a size of transport block that can be transmitted in a TTI and perform data pre-processing based on the threshold. The threshold may be determined based on at least one of a type of bearer, a type of service, QoS, priority, required data rate, and required transmission delay. The controller 1p-40 may also control to perform data pre-processing on multiple logical channels in parallel or perform pre-processing on a plurality of data items in one logical channel. The controller 1p-40 may also control the operation of a UE according to embodiments of FIGS. 1 to 20 as well as the method described with reference to FIG. 21.

Figure 22:
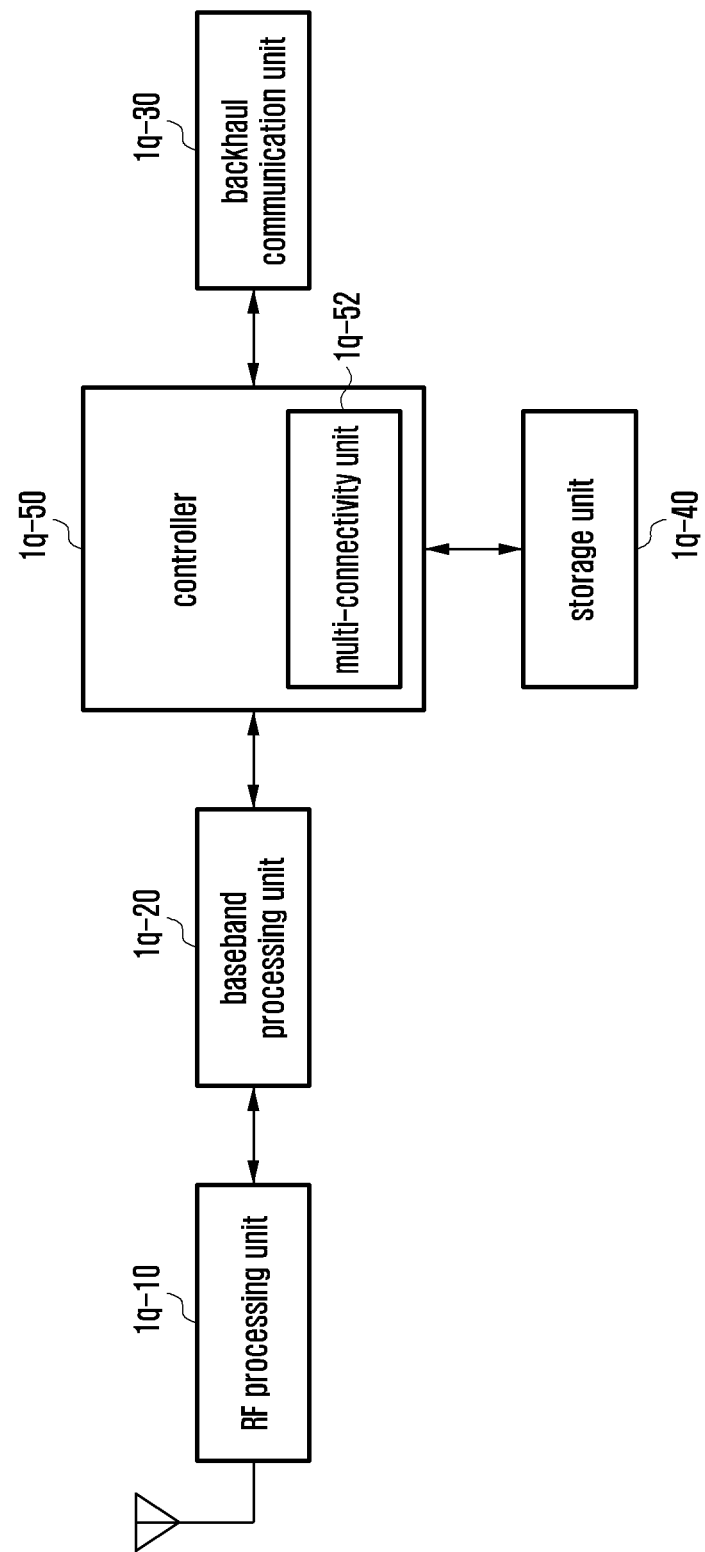
FIG. 22 is a block diagram illustrating a configuration of a gNB according to an embodiment of the present disclosure.

FIG. 22 is a block diagram illustrating a configuration of a gNB according to an embodiment of the present disclosure.

As shown in FIG. 22, the gNB includes an RF processing unit 1q-10, a baseband processing unit 1q-20, a backhaul communication unit 1q-30, a storage unit 1q-40, and a controller 1q-50. The gNB may be simply configured to have a controller and a transceiver. In this case, the controller may include at least one processor.

The RF processing unit 1q-10 implements signal band conversion and amplification for transmitting signals over a radio channel. That is, the RF processing unit 1q-10 up-converts a baseband signal output from the baseband processing unit 1q-20 to an RF band signal for transmission through the antenna(s) and down-converts an RF band signal received through the antenna(s) to a baseband signal. The RF processing unit 1q-10 may include a transmission filter, a reception filter, an amplifier, a mixer, an oscillator, a DAC, and an ADC. Although one antenna is depicted in the drawing, the gNB may include a plurality of antennas. The RF processing unit 1q-10 may include a plurality of RF chains. The RF processing unit 1q-10 may perform beamforming. For beamforming, the RF processing unit 1q-10 may adjust the phases and sizes of the signal transmitted/received through the antennas or antenna elements. The RF processing unit 1q-10 may perform a downlink MIMO operation to transmit multiple layers.

The baseband processing unit 1q-20 takes charge of converting between baseband signals and bit strings according to a physical layer protocol of the system. For example, the baseband processing unit 1q-20 performs encoding and modulation on the transmit bit strings to generate complex symbols in data transmission mode. The baseband processing unit 1q-20 also performs demodulation and decoding on the baseband signal from the RF processing unit to recover the received bit strings in data reception mode. For the case of an OFDM system, the baseband processing unit 1q-20 performs encoding and modulation on the transmit bit string to generate complex symbols, maps the complex symbols to subcarriers, performs IFFT on the subcarriers, and inserts a CP to generate OFDM symbols in the data transmit mode. The baseband processing unit 1q-20 splits the baseband signal from the RF processing unit 1q-10 into OFDM symbols, recovers the signals mapped to the subcarriers through FFT, and performs demodulation and decoding to recover the bit strings in the data reception mode. The baseband processing unit 1q-20 and the RF processing unit 1q-10 assist in transmitting and receiving signals as described above. Accordingly, the baseband processing unit 1q-20 and/or the RF processing unit 1q-10 may be referred to as a transmission unit, a reception unit, a transceiver, or a communication unit.

The backhaul communication unit 1q-30 is provided with an interface for communication with other nodes in the network.

The storage unit 1q-40 stores basic programs for operation of the gNB, application programs, and data such as configuration information. In particular, the storage unit 1q-40 may store the information on the bearers allocated to a connected terminal and measurement result reported by a terminal. The storage unit 1q-40 may also store the information as criteria for determining whether to enable or disable multi-connectivity for a terminal. The storage unit 1q-40 provides the stored data in response to a request from the controller 1q-50.

The controller 1q-50 controls operations of the gNB. For example, the controller 1q-50 may control the baseband processing unit 1q-20, the RF processing unit 1q-10, and the backhaul communication unit 1q-30 for transmitting/receiving signals. The controller 1q-50 may include multi-connectivity unit 1q-52. The controller 1q-50 also writes and reads data to and from the storage unit 1q-40. In order to accomplish this, the controller 1q-50 may include at least one processor.

According to an embodiment of the present disclosure, the controller 1q-50 may include at least one of a processor, a processing unit, and a processing module for performing the operations of the NR PDCP, NR RLC, and NR MAC layers. Although specific terms (e.g., PDCP entity, RLC entity, MAC entity, and PHY entity) are used to describe and illustrate the embodiments of the present disclosure for convenience of explanation, the configuration of the gNB is not limited thereby. Each entity may be a layer-specific entity or an entity responsible for operations of two or more layers. Although the layer-specific operations are logically distinguished from each other, the controller 1q-50 may control the operations of the respective logical layers in an overlapping manner.

According to an embodiment of the present disclosure, the operations of the gNB as a transmitting device may correspond to the operations of the UE; thus, the controller 1q-50 of the gNB in FIG. 22 is capable of performing the operations of the controller 1p-40 of the UE in FIG. 21 in respect to embodiments of the present disclosure.

The controller 11-50 may also control to perform the operations that have been described in the embodiments of FIGS. 1 to 22 as well as the operations described with reference to FIG. 22.

As described above, the data processing method and apparatus of the present disclosure is advantageous in terms of improving a data processing speed of a transmitting device by employing a pre-processing phase in a next generation mobile communication system.

In addition, the data processing method and apparatus of the present disclosure is advantageous in terms of accelerating a data processing speed of a terminal to make it possible to use high-speed high-quality services at a high data rate and with a short latency time in a next generation mobile communication system.

In addition, the data processing method and apparatus of the present disclosure is advantageous in terms of facilitating implementation of a next generation mobile communication system meeting the requirements of a high data rate and low latency by accelerating the data processing speed of a terminal through de-functionalization of the concatenation function of the RLC layer and employment of a pre-processing phase.

Moreover, the data processing method and apparatus of the present disclosure is advantageous in terms of protecting against reduction of downlink data processing throughput by allowing a terminal to determine its feedback transmission frequency dynamically.

Although various embodiments of the present disclosure have been described above, the specification and drawings are to be regarded as illustrative rather than restrictive in order to help understand the present disclosure. It is obvious to those skilled in the art that various modifications and changes can be made thereto without departing from the broader spirit and scope of the disclosure. Thus, the technical scope of the present disclosure encompasses not only those embodiments described above, but also all that fall within the scope of the appended claims and their equivalents.

What is claimed is:

1. A method performed by a transmitting device in a wireless communication system, the method comprising:
   acquiring data;
   generating a packet data convergence protocol (PDCP) protocol data unit (PDU) based on the data in a PDCP layer of the transmitting device;
   delivering the PDCP PDU to a radio link control (RLC) layer of the transmitting device;
   generating an RLC PDU including an RLC header and an RLC service data unit (SDU) in an RLC layer of the transmitting device based on the PDCP PDU before receiving information associated with a resource allocation for transmitting the data;
   generating a medium access control (MAC) PDU including at least one MAC control element that is placed after at least one MAC SDU that is generated based on the RLC PDU; and
   transmitting, to a receiving device, the MAC PDU.

2. The method of claim 1, wherein the RLC SDU is segmented based on the information associated with the resource allocation from the MAC layer of the transmitting device.

3. The method of claim 1, further comprising:
   delivering the RLC PDU to a MAC layer of the transmitting device.

4. The method of claim 1, further comprising:
   generating a MAC sub-header and a MAC SDU based on the RLC PDU in a MAC layer of the transmitting device.

5. The method of claim 1, further comprising:
   segmenting the RLC SDU based on the information associated with the resource allocation,
   wherein the segmented RLC SDU is transported using at least two RLC PDUs.

6. The method of claim 5, wherein segment information of the RLC header is updated in case that the RLC SDU is segmented.

7. The method of claim 1, further comprising:
   adding a MAC sub-PDU including a MAC sub-header for padding to an end of the MAC PDU.

8. The method of claim 7, further comprising:
   configuring a threshold corresponding to a size of a transport block transmittable within a transmission time interval (TTI),
   wherein an operation of the terminal for the pre-processing is performed based on the threshold, and
   wherein the threshold is determined based on at least one of a type of bearer, a type of service, a quality of service (QoS), a priority, a required data rate, and a required transmission delay.

9. The method of claim 1, further comprising:
   pre-processing the data in a plurality of logical channels established in the transmitting device in parallel; or
   pre-processing a plurality of data in one logical channel.

10. The method of claim 1, wherein the MAC PDU consists of a plurality of MAC sub-PDUs, the MAC control element, and paddings,
    wherein each MAC sub-PDU consists of one MAC sub-header and one MAC SDU, and
    wherein each of the MAC sub PDUs are concatenated in the MAC PDU.

11. A transmitting device in a wireless communication system, the transmitting device comprising:
    a transceiver; and
    a controller configured to:
    acquire data,
    generate a packet data convergence protocol (PDCP) protocol data unit (PDU) based on the data in a PDCP layer of the transmitting device,
    deliver the PDCP PDU to a radio link control (RLC) layer of the transmitting device,
    generate an RLC PDU including an RLC header and an RLC service data unit (SDU) in an RLC layer of the transmitting device based on the PDCP PDU before receiving information associated with a resource allocation for transmitting the data,
    generate a medium access control (MAC) PDU including at least one MAC control element that is placed after at least one MAC SDU that is generated based on the RLC PDU, and
    transmit, to a receiving device via the transceiver, the MAC PDU.

12. The transmitting device of claim 11, wherein the RLC SDU is segmented based on the information associated with the resource allocation from the MAC layer of the transmitting device.

13. The transmitting device of claim 11, wherein the controller is further configured to:
    deliver the RLC PDU to a MAC layer of the transmitting device.

14. The transmitting device of claim 11, wherein the controller is further configured to:
    generate a MAC sub-header and a MAC SDU based on the RLC PDU in a MAC layer of the transmitting device.

15. The transmitting device of claim 11, wherein the controller is further configured to segment the RLC SDU based on the information associated with the resource allocation, and
    wherein the segmented RLC SDU is transported using at least two RLC PDUs.

16. The transmitting device of claim 15, wherein segment information of the RLC header is updated in case that the RLC SDU is segmented.

17. The transmitting device of claim 11, wherein the controller is further configured to add a MAC sub-PDU including a MAC sub-header for padding to an end of the MAC PDU.

18. The transmitting device of claim 17, wherein the controller is further configured to configure a threshold corresponding to a size of a transport block transmittable within a transmission time interval (TTI),
    wherein an operation of the terminal for the pre-processing is performed based on the threshold, and
    wherein the threshold is determined based on at least one of a type of bearer, a type of service, a quality of service (QoS), a priority, a required data rate, and a required transmission delay.

19. The transmitting device of claim 11, wherein the controller is further configured to:
- pre-process the data in a plurality of logical channels established in the transmitting device in parallel; or
- pre-process a plurality of data in one logical channel.

20. The transmitting device of claim 11, wherein the MAC PDU consists of a plurality of MAC sub-PDUs, the MAC control element, and paddings,
- wherein each MAC sub-PDU consists of one MAC sub-header and one MAC SDU, and
- wherein each of the MAC sub PDUs are concatenated in the MAC PDU.

\* \* \* \* \*